UNITED STATES PATENT OFFICE.

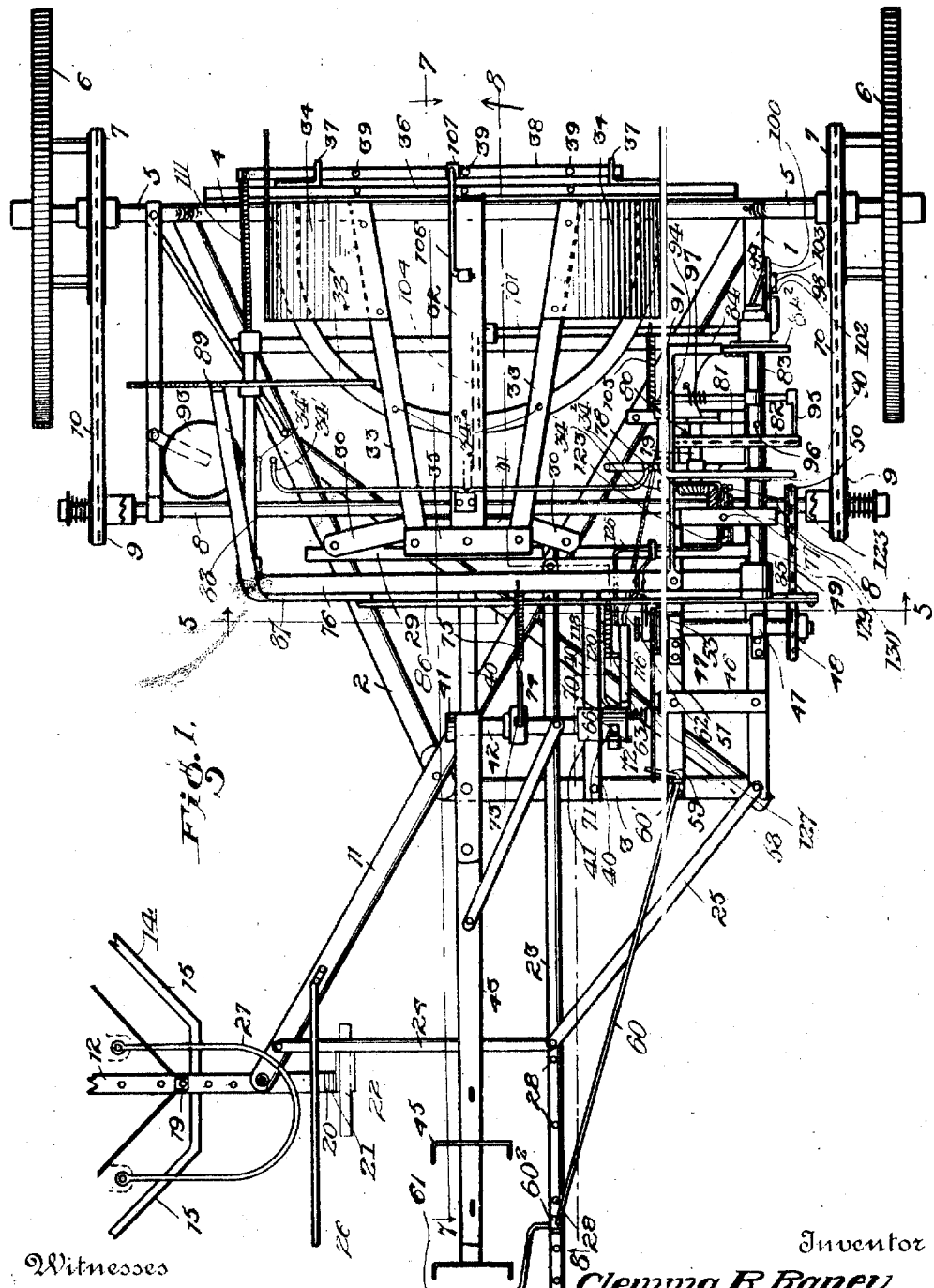

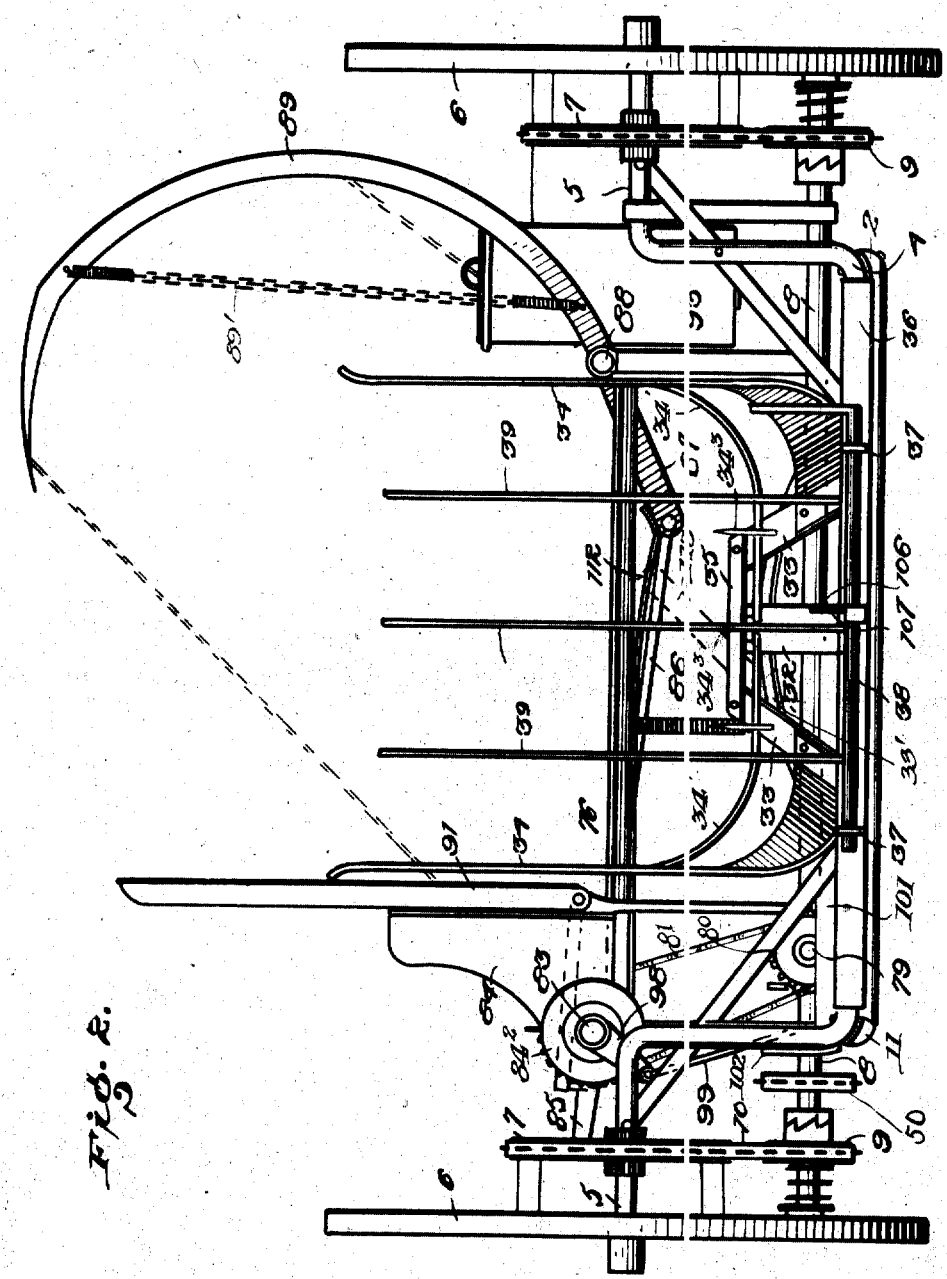

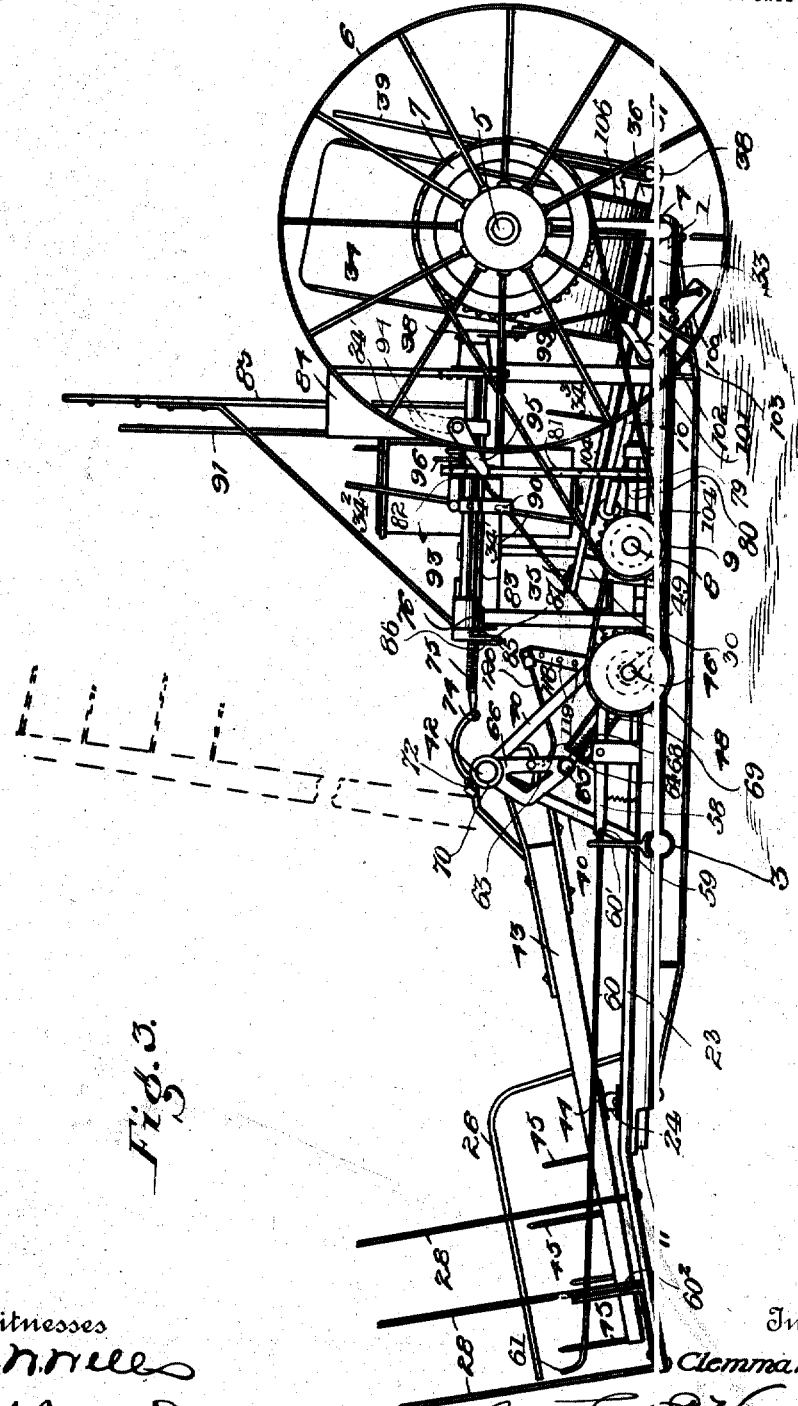

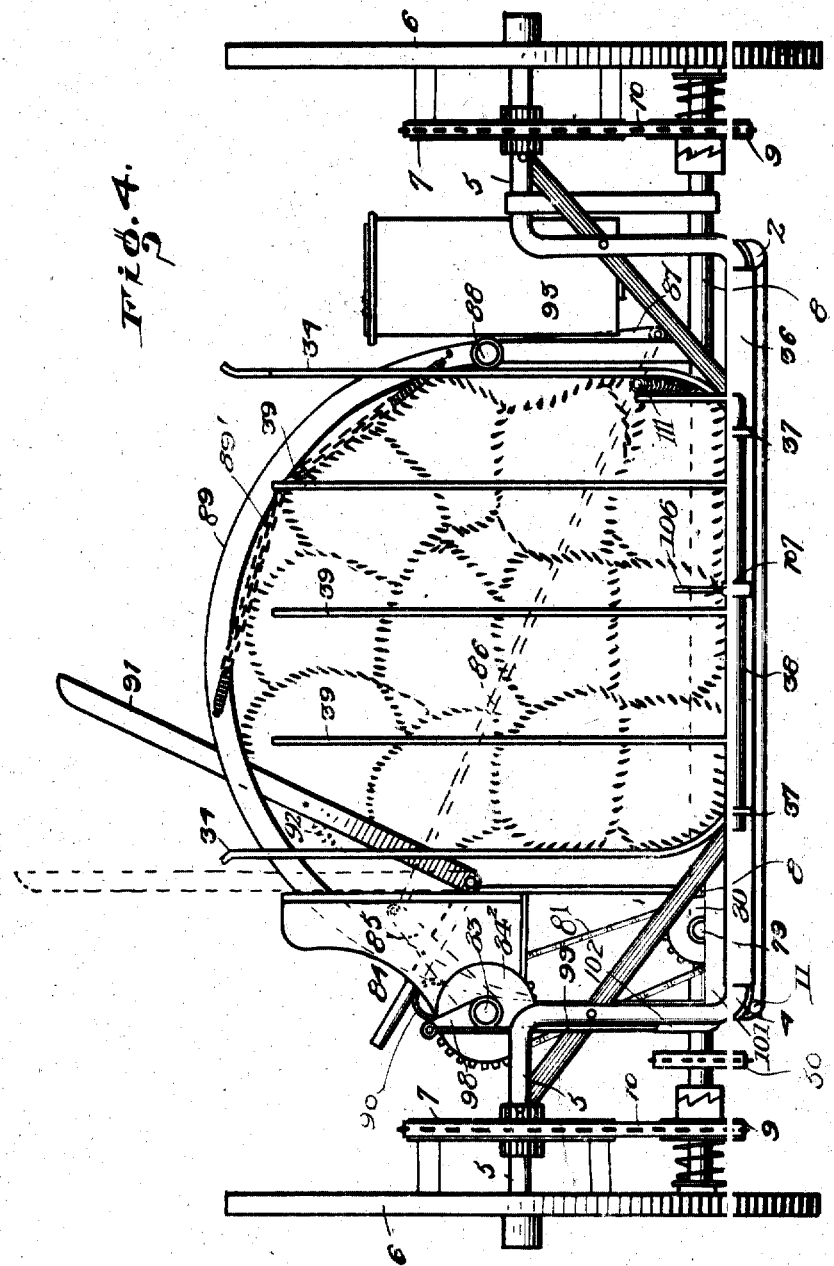

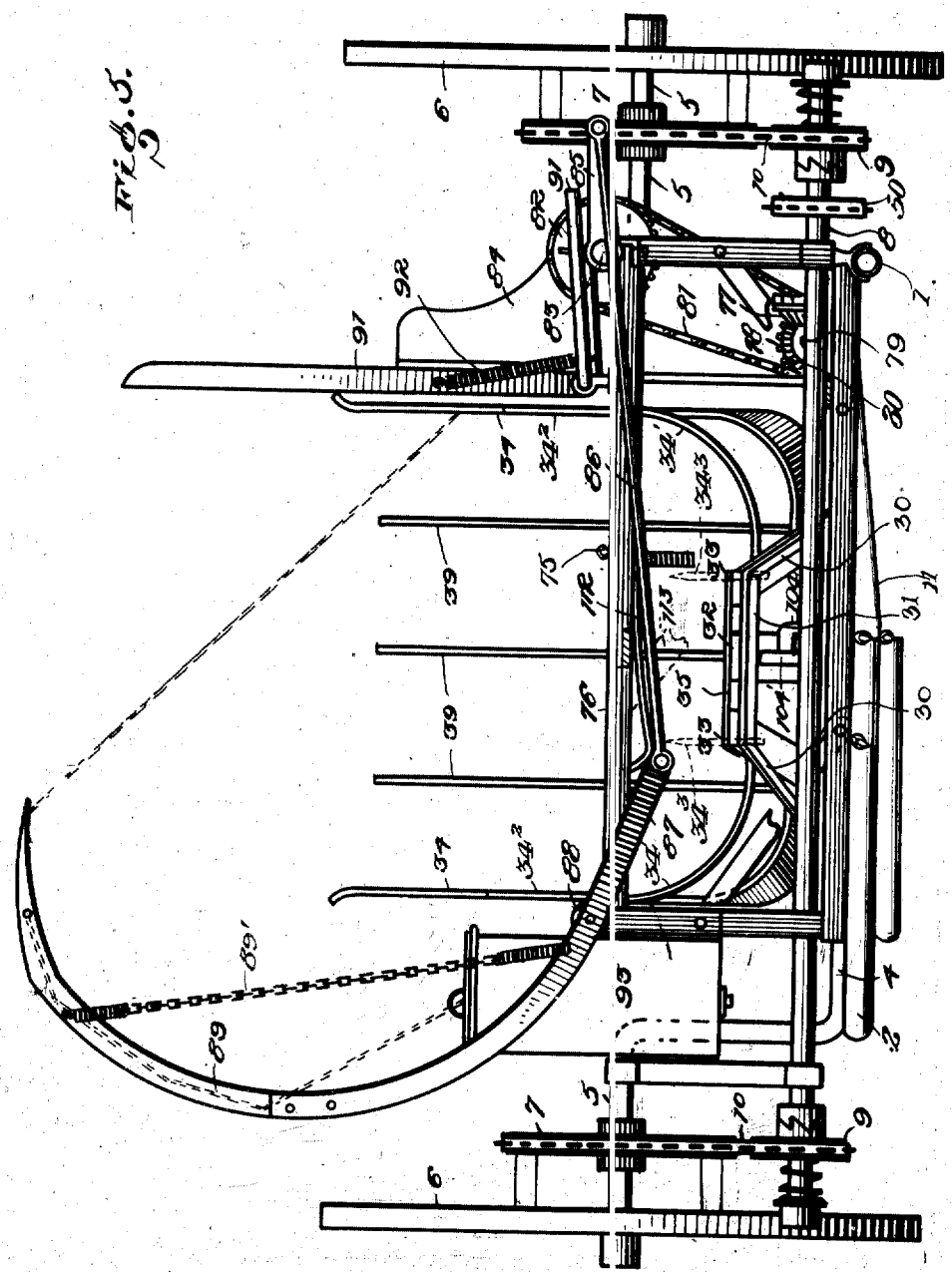

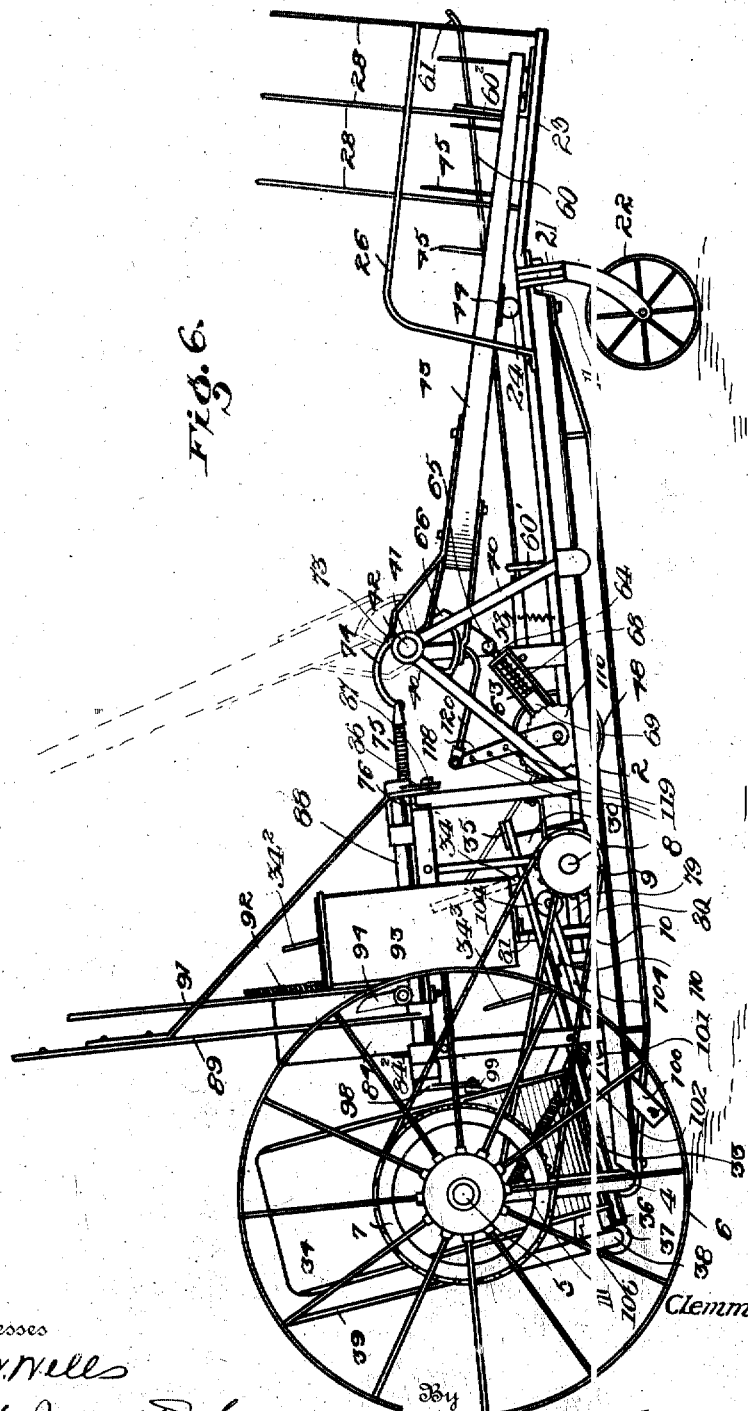

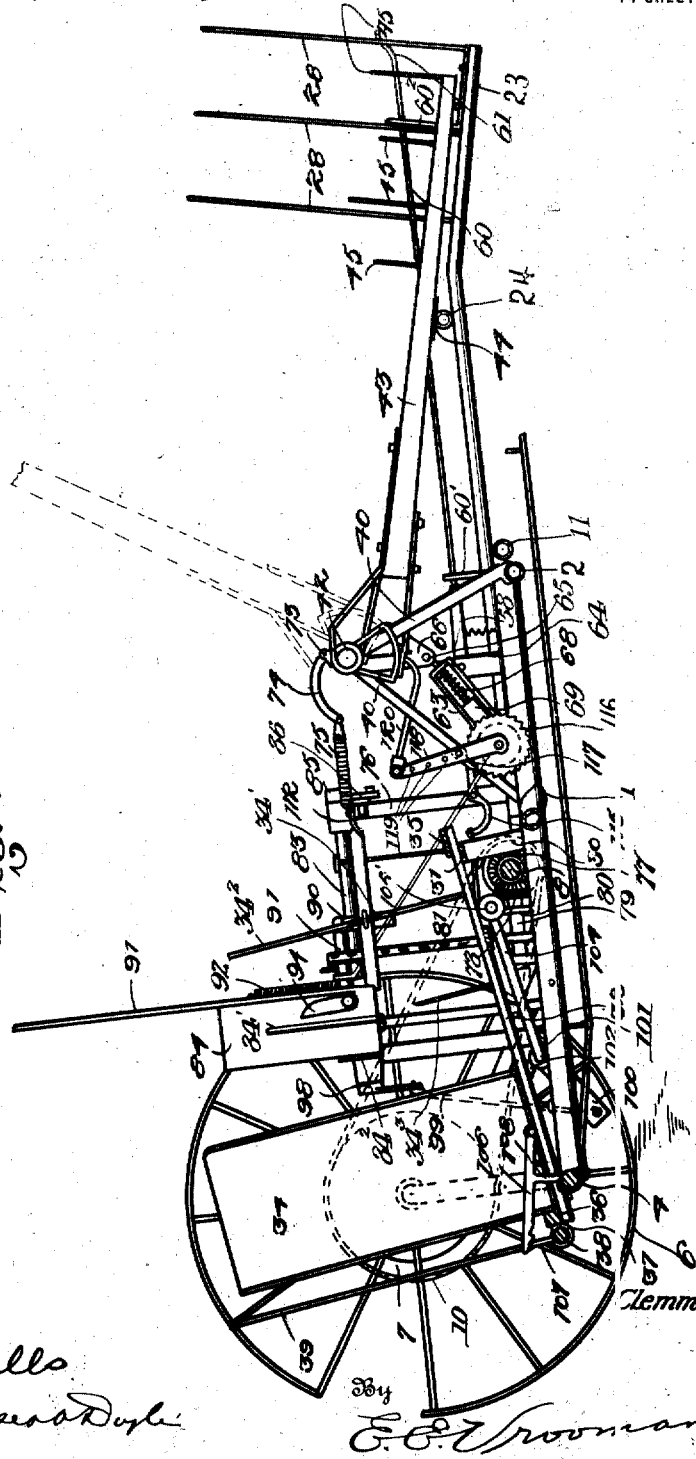

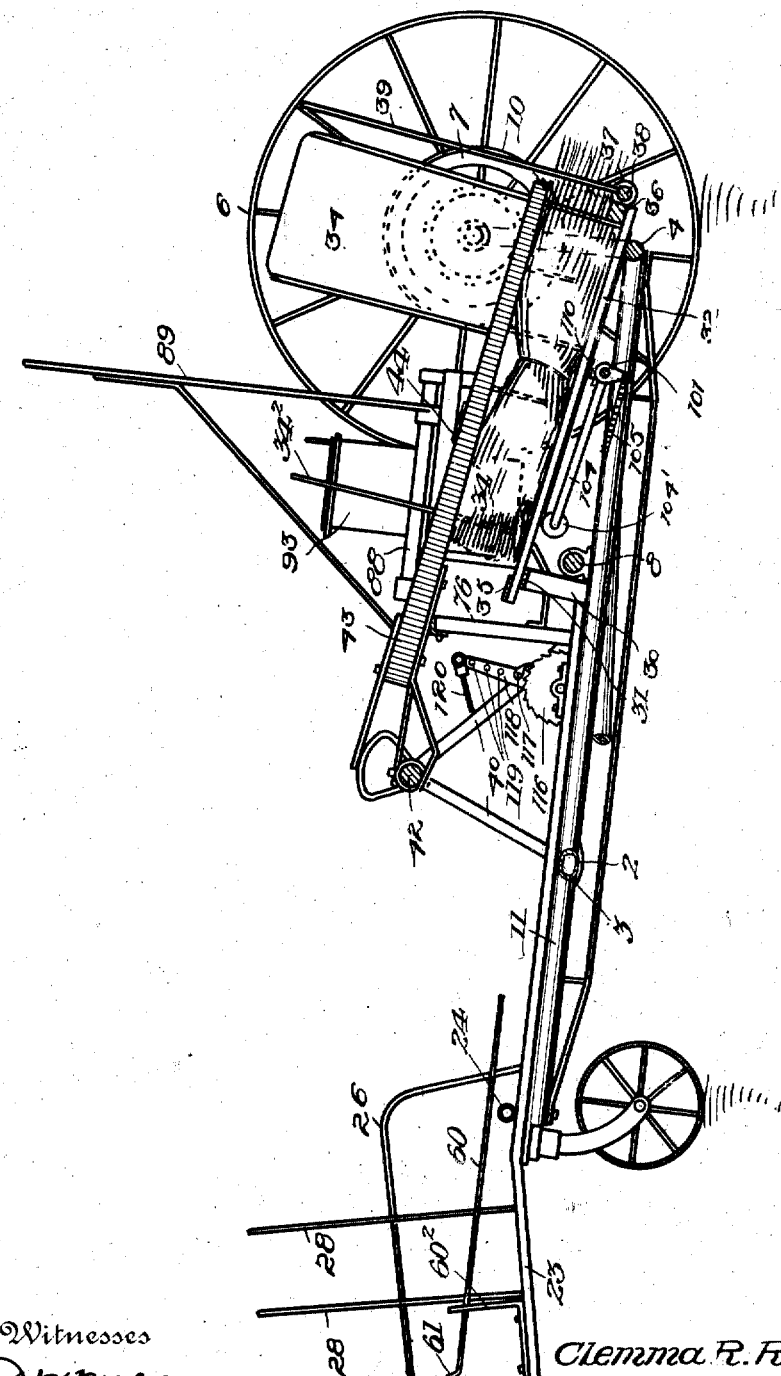

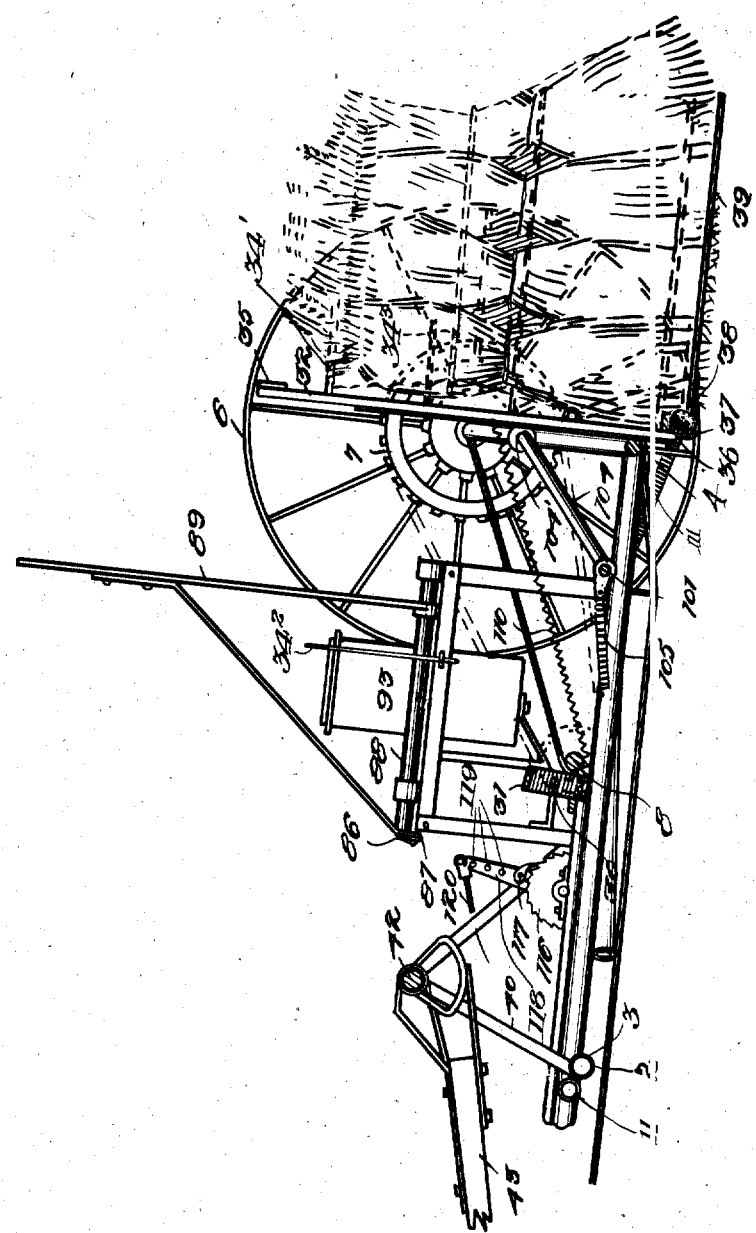

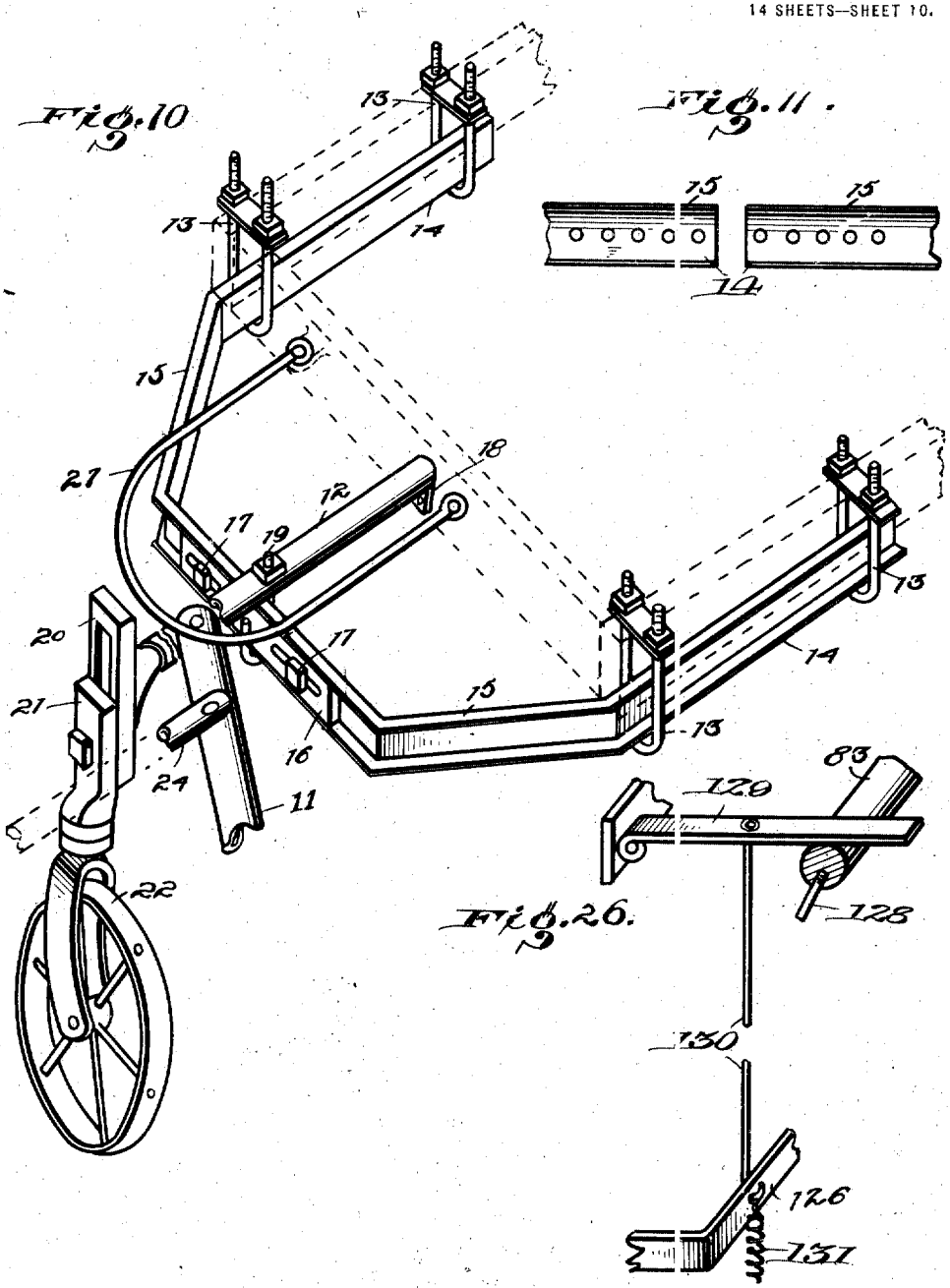

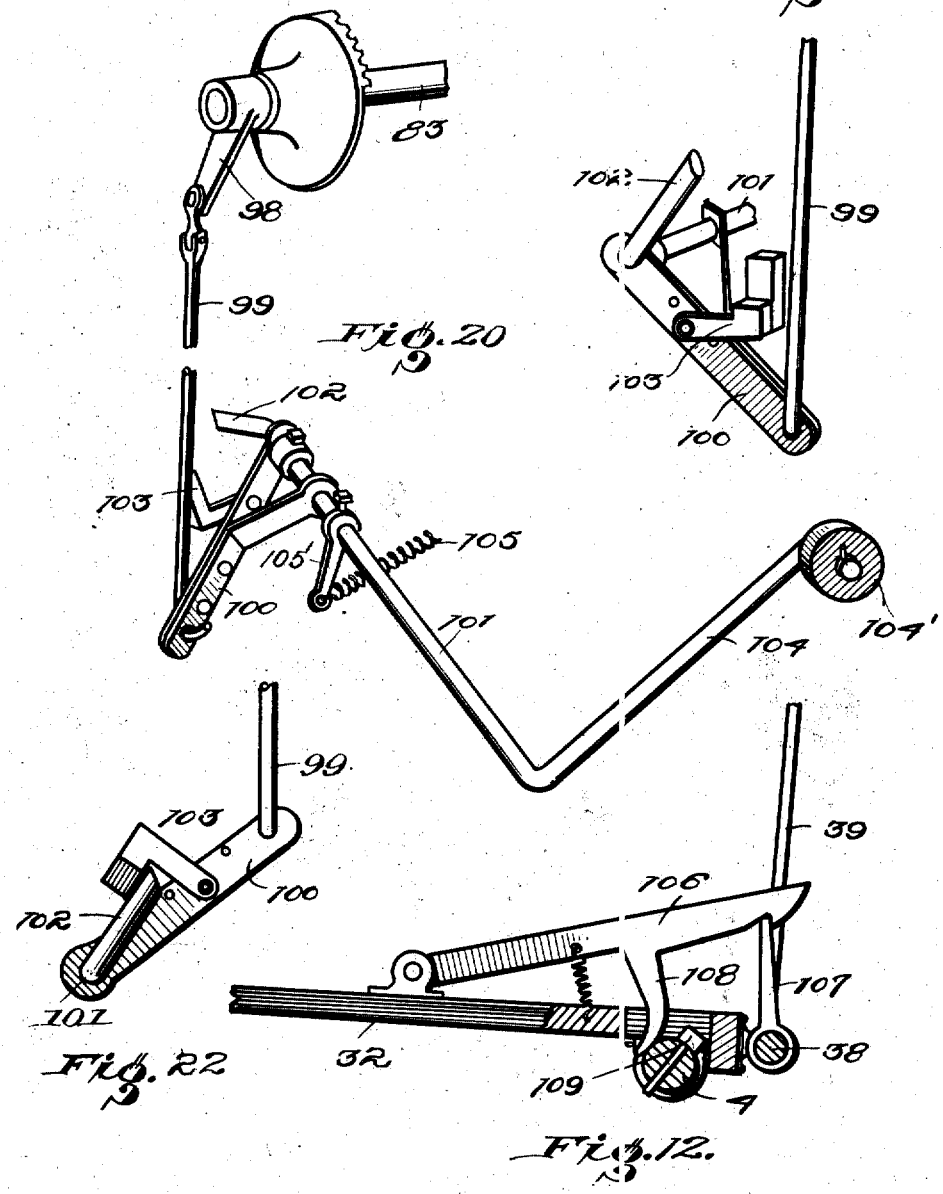

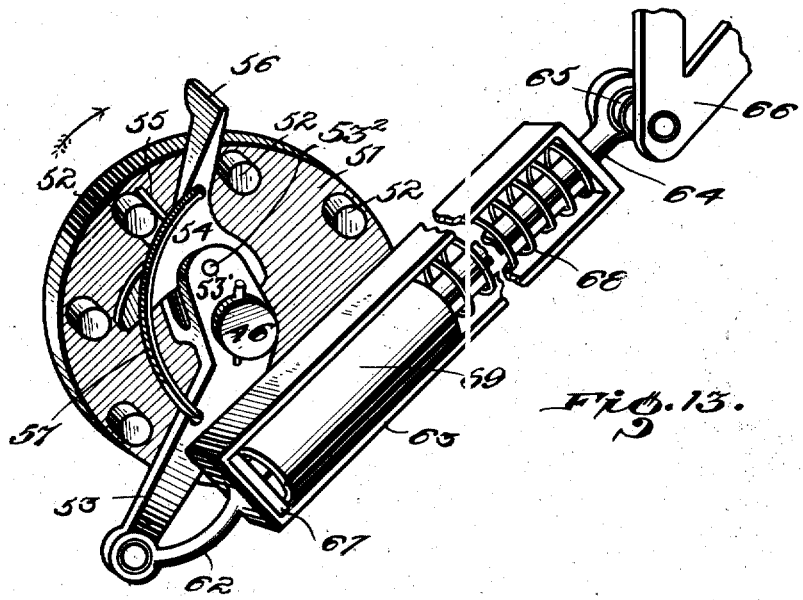
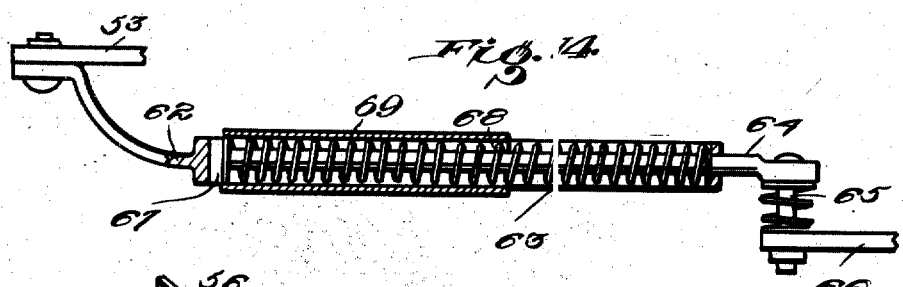
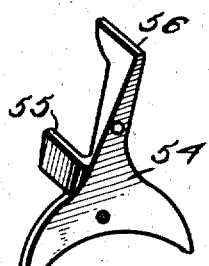
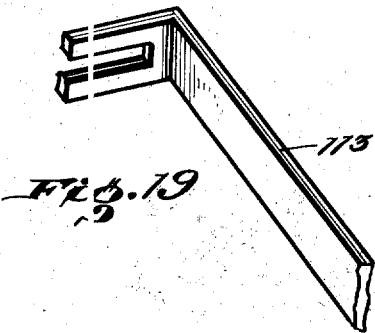

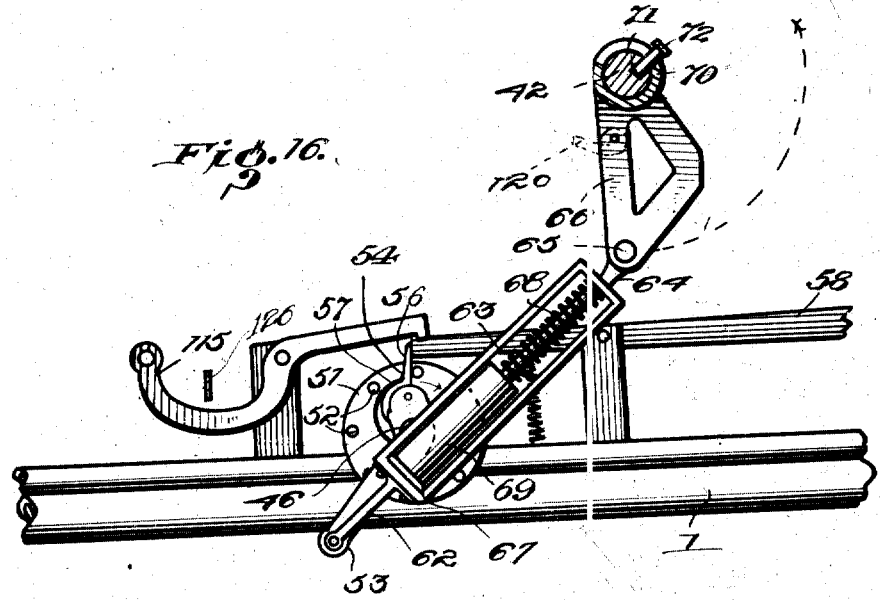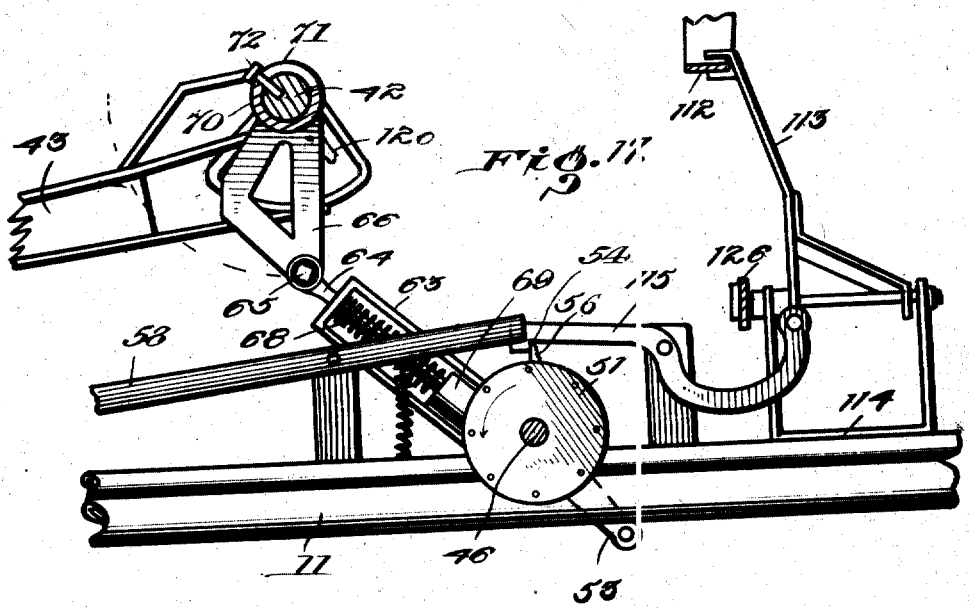

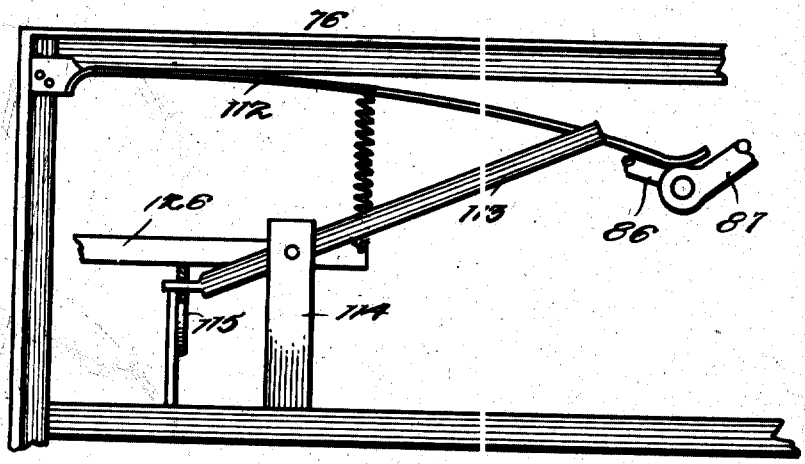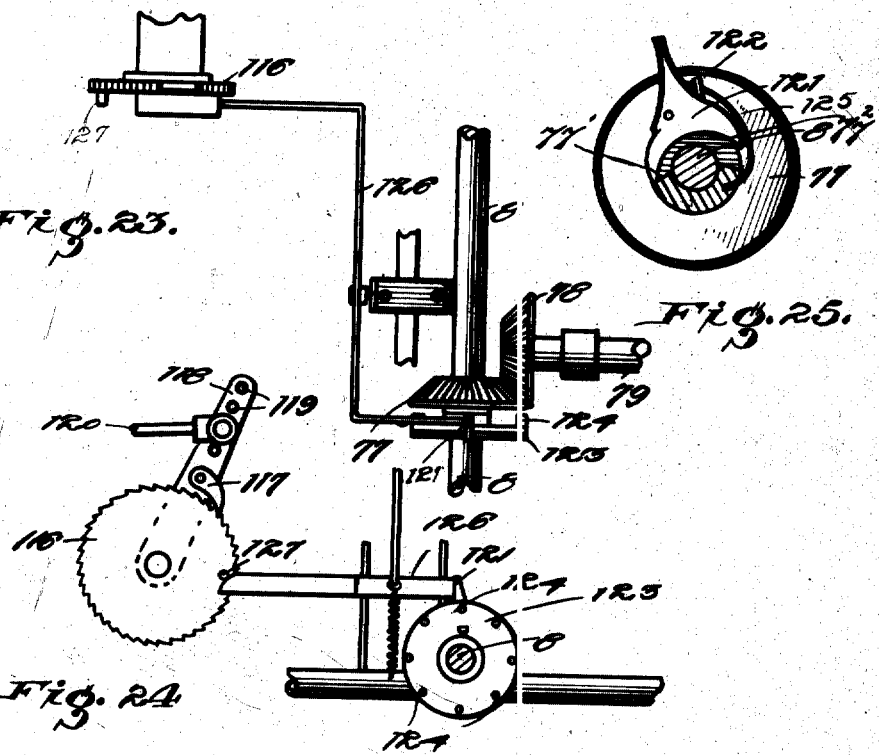

CLEMMA R. RANEY, OF CENTERVILLE, IOWA, ASSIGNOR OF ONE-HALF TO R. J. RANEY, OF CENTERVILLE, IOWA.

SHOCKING-MACHINE.

1,222,796.     Specification of Letters Patent.     Patented Apr. 17, 1917.

Application filed July 21, 1910. Serial No. 573,106.

*To all whom it may concern:*

Be it known that I, CLEMMA R. RANEY, a citizen of the United States, residing at Centerville, in the county of Appanoose and State of Iowa, have invented certain new and useful Improvements in Shocking-Machines, of which the following is a specification, reference being had therein to the accompanying drawing.

My invention relates to shocking machines. It has for its object to form the sheaves ejected from a harvesting machine into a shock in an improved manner. A further object of my invention is to improve and simplify the construction of a shocking machine in such a manner that the sheaves are automatically delivered thereto and compressed, bound and discharged upon the ground thereby in a shock of sturdy and compact construction, which will stand up well in the field. A further object of my invention is to produce a shocking machine which is adapted to operate under varying grain conditions, is rapid and reliable in its operation and is of a rugged construction, well adapted to withstand the strain of continued service. I attain these objects by providing improved means for delivering the sheaves to the shocker cradle, and improved coöperating means for compressing, binding and discharging the sheaves therein, all of these means being provided with improved automatically acting controlling mechanism rendering the machine entirely automatic in its operation. My invention also includes improvements in the several mechanisms.

In this application I have, for purposes of illustration, shown one embodiment which my invention may assume in practice. It is to be understood, however, that my invention is not limited to the specific construction shown herein for purposes of illustration, and that the embodiment thereof shown herein is susceptible of modification.

Figure 1 is a top plan view of the shocker;

Fig. 2 is a rear elevation of the same;

Fig. 3 is a side elevation of the same;

Fig. 4 is a rear elevation of the same, showing the sheaves being bound thereby;

Fig. 5 is a transverse sectional view on line 5—5 of Fig. 1;

Fig. 6 is a side elevation of the opposite side of the machine shown in Fig. 3;

Fig. 7 is a longitudinal sectional view taken on line 7—7 of Fig. 1;

Fig. 8 is a partial side elevation of Fig. 1, taken on line 8—8 of Fig. 1, showing the parts in sheaf delivering position;

Fig. 9 is a partial side elevation taken on the same line as Fig. 8, showing a shock being deposited on the ground;

Fig. 10 is a detail view of the coupling frame;

Fig. 11 is a detail view of the ends of the side members of said frame;

Fig. 12 is a detail view of the latching mechanism for the sheaf receiving cradle;

Figs. 13, 14, 15, 16 and 17 are detail views of parts of the sheaf delivering mechanism;

Figs. 18 and 19 are detail views of portions of the mechanism rendering the sheaf delivering mechanism inoperative;

Figs. 20, 21 and 22 are detail views of parts of the mechanism for operating the sheaf receiving cradle;

Figs. 23, 24 and 25 are detail views of the controlling mechanism for the binding mechanism;

Fig. 26 is a detail view of the mechanism permitting an additional revolution of the knotter shaft.

The shocker shown herein comprises, when broadly considered, automatic sheaf delivering mechanism adapted to receive the sheaves from a harvester and deliver the same to the sheaf receiving cradle of the shocker, automatic mechanism for compressing and binding the sheaves in said cradle, automatic mechanism for rendering the sheaf delivering mechanism inoperative during the compressing and binding operation, and automatic mechanism operable when a predetermined number of sheaves have been delivered to the sheaf receiving cradle to discharge the same therefrom butt end downward upon the ground in the shape of a shock. All of these mechanisms are provided with suitable controlling mechanism coöperating therewith to operate the same automatically in the desired sequence, are automatically returned to their initial positions after each operation thereof, and are carried upon a suitable shocker truck adapted to be attached to and trailed at the rear of a harvester.

I will first describe the shocker truck and the power and draft connections therefor in order that the relation of the shocker to the harvester may be clearly understood.

The shocker truck.

This truck is of the sulky type and is shown herein to be adapted to trail at the rear and on the stubbleward side of a "right-hand" harvester. It may, however, obviously be used with a harvester of another type if desired.

It comprises a substantially horizontally disposed frame formed of rigid side members 1 and 2 (Fig. 1) connected at their front ends by a transversely extending member 3, and at their rear ends by a bowed portion 4 of the truck axle 5. In the construction shown, the power for the shocker is generated by its own wheels 6, rather than from the harvester, and is conveyed therefrom through sprockets 7, which may be suitably fastened to the wheels 6, to a countershaft 8 extending transversely across the shocker frame at a point intermediate its ends, and provided with suitable slip-clutch connected sprockets 9 upon its free ends adapted to be rotated by suitable chains 10 connecting the same with the sprockets 7.

The draft connections for the truck (Fig. 1) are made at the end of a diagonally extending coupling bar 11 which is fixed at its rear end to the rear end of the frame and extends diagonally across and beyond the front of the same toward the harvester, where it is pivotally and adjustably connected to a draft bar 12. This draft bar 12 is supported by a coupling frame connected at its inner end to the harvester by means of suitable clips 13 (Fig. 10), and comprising two channel bars 14 having converging ends 15 adjustably connected to each other by means of a plate 16 and bolts 17. As shown, the draft bar 12 extends over the ends of the bars 14 and is provided at its inner end with a flange 18, which may be suitably fastened to the harvester frame. At a point intermediate its ends the draft bar 12 is adjustably connected to the converging ends 15 of the bars 14 by means of a suitable clip 19. The outer end of the draft bar is provided with a vertical slotted plate 20 to which is adjustably attached the vertical shank 21 of a caster wheel 22.

Fixed to the coupling bar 11 at a point intermediate its ends is a longitudinally extending tongue 23 braced transversely by a bar 24 attached to the bar 11 and also braced by a suitable diagonally extending stay 25 attached at one end to one of the corners of the frame, and at the other end to the tongue 23. Upon the outer end of this tongue a plurality of regularly spaced vertically extending tines 28 are provided which coöperate with a forwardly extending guard rail 26 fixed to the coupling bar 11, and a bowed guide bar 27, extending over the draft connections to the harvester, to retain the sheaves in proper position to be operated upon by the shocking mechanism after their ejection from the binder, the tines 28 preventing the sheaves from passing beyond the fork and causing them to fall on the fork trip, hereinafter described.

Carried upon the rear of the shocker frame is the sheaf-receiving receptacle or cradle to which the sheaves are delivered from the binder and in which the same are compressed and bound in a shock.

The sheaf-receiving cradle.

This sheaf-receiving cradle normally reclines upon the shocker frame in the position shown in Figs. 2 and 3, and is adapted to be tilted rearwardly about its pivot upon the rear end of the latter to discharge the shock therein.

In the form shown herein the front or inner end of this cradle is held slightly higher than the opposite end of the same and is supported near the middle of the frame on a transversely extending brace bar 29, carrying standards 30 connected by a base bar 3'. The sheaf-receiving cradle itself comprises a longitudinally extending center member 32 and a plurality of spaced side members 33, supported by and attached to an underlying U-shaped member 33', as well as upstanding outwardly bowed guard wings 34 and a transversely extending connecting member 35 and bar 36, which serve to connect the forward and rear ends respectively of the members 32 and 33, and form therewith a substantially trough-shaped cradle provided with an inclined bottom and substantially vertical side walls (Fig. 2). Upon the front end of the cradle vertically extending sheaf positioning arms 34¹ are provided which coöperate with similar arms 34² carried by the shocker frame. Upon the bottom of the cradle a plurality of substantially vertically extending sheaf piercing tines 34³ are mounted. As heretofore indicated, this cradle is adapted to swing vertically upward and backward to sheaf discharging position, being pivoted at its rear end upon the bowed portion of axle 5.

Coöperating with this cradle in a manner hereafter more specifically described is an end-gate shown in the form of a series of tines pivotally mounted at the rear of the frame on a transversely extending bar and normally occupying the position shown in Figs. 2 and 3. As illustrated these tines are carried on a transversely extending rod or shaft rotatable with respect to the bar 36 in bearings 37, the rod being shown at 38, and provided with a plurality of transversely spaced tines 39 normally extending vertically upward to form an end-gate for the cradle.

Coöperating with the sheaf-receiving cradle and adapted to deliver the sheaves ejected from the binder deck to the sheaf-receiving cradle and turn them butt end rearward during the process of delivering them so that their butts protrude through the tines 39 of the cradle end-gate, is the sheaf delivering member.

Sheaf delivering member.

This sheaf delivering member is shown to be in the form of a pivoted fork adapted to oscillate back and forth about its pivot through an arc of substantially 200° in moving from sheaf receiving position adjacent the harvester deck (Fig. 3) to sheaf discharging position above the cradle (Fig. 8).

This fork is pivotally mounted on vertically extending standards 40 carried on the forward end of the shocker frame and is rotatable in end bearings 41 thereon with a transversely extending fork shaft 42, as shown in Figs. 1, 16 and 17, the fork itself being indicated as 43. In sheaf receiving position the sheaf carrying end of this fork rests upon the transversely extending bar 24, carried by the shocker frame, at a point between the guard rail 26 and the tongue 23 and adjacent the binder deck of the harvester. Since this bar serves to establish one of the limits of travel of the fork during the operation of filling the cradle, in order to absorb the detrimental shocks and the rebound of the fork incidental to its contact therewith, cushioning material 44 (Fig. 3) may be provided on the fork. Obviously, the fork may, however, be cushioned by other means than that shown, and it is not necessary that they be carried upon the fork proper. In sheaf delivering position this fork occupies the position shown in Fig. 8, wherein it is above the sheaf and at the bottom of the cradle as the sheaf is deposited therein. Obviously, as the cradle is filled and the sheaves are piled up therein, the fork will be gradually limited in its movement, as hereinafter more fully described. It is to be noted that the tines 45 of this fork are carried upon the free end of the same in a plurality of spaced pairs and project upward in sheaf-receiving position and downward in sheaf-delivering position so that the sheaves falling from the harvester deck are readily and securely impaled thereon in one position and are readily disengaged therefrom in the other position. It is further to be noted that the fork is so constructed that its pivot point is at one side of its center line, thus enabling the same to coöperate with the slanting cradle bottom to position the sheaves and to be readily separated from the latter after they have been deposited in the cradle.

Coöperating with this fork and operating to drive the same back and forth between sheaf receiving and sheaf discharging position during the filling of the sheaf receiving cradle, is the sheaf delivering mechanism.

Sheaf delivering mechanism.

This mechanism is operatively connected between the fork or rocker shaft 42 and the shocker wheels 6, and transmits the power from the latter in such a manner as to oscillate the fork alternately in opposite directions from sheaf receiving to sheaf discharging position.

It comprises a transversely extending stub shaft 46 (Fig. 1) journaled in suitable bearings carried by standards 47 on the forward end of the base frame. The outer end of this shaft is provided with a sprocket 48 and is connected through a chain 49 with a sprocket 50 carried by the countershaft 8. The inner end of this shaft 46 is connected to a clutch of any desired construction commonly used in harvesting machines, controlling the connection of the same to the power shaft 8.

This clutch, as shown in Figs. 1, 13 and 15, comprises a clutch member 51, carried upon the shaft 46, having a row of studs 52 on one surface thereof, and coöperating with a crank arm or coöperating clutch member 53 loosely mounted on the shaft 46 adjacent member 51. This member 53 is provided with a lug $53^1$ at its shorter end, having a slot therein to receive a pawl 54. This pawl is pivotally connected to said lug and is eccentrically mounted with respect to the axis of said crank arm on a pin $53^2$. A laterally projecting arm 55 is adapted to be engaged by any one of the studs 52 to cause the shaft and clutch member 51 to rotate together. The pawl 54 is provided with a clutch controlling arm 56 that protrudes radially beyond the periphery of the clutch member 51 and this pawl 54 is connected to the member 53 by means of a spring 57.

Coöperating with this clutch is the mechanism controlling the clutch and, through the latter, the connection of the sheaf delivering fork to the source of power. (Figs. 1, 16 and 17.) The free end of the clutch arm 56 normally engages one end of a longitudinally extending tripping member 58 which normally holds the clutch members disengaged from each other. The member 58 is pivoted to the frame at a point intermediate its ends, its forward end in engagement with the rear end 59 of a longitudinally extending trigger rod 60 (Figs. 1, 3 and 6) having bearings $60^1$ and $60^2$ on the frame and arm 23, respectively. This trigger rod 60 has an operating finger 61 at its front end which extends across between the bar 23 and the guard rail 26 adjacent the end of fork 43 and in the path of a sheaf delivered from the harvester.

The power connections between the clutch and the rocker shaft 42 (Figs. 7, 13, 14, 16 and 17) include an arm 62 pivotally connected to the outer end of the member 53 and carrying a substantially rectangular housing 63 through which a link 64 is slidable. This link is pivotally connected at its upper end to a stud or bolt 65 which projects laterally from the lower end of a crank arm 66 freely rotatable on the end of the rocker shaft 42. In a preferred form the free end of the link 64, within the housing 63, carries an abutment plate 67 forming a seat for one end of a spring 68 coiled about the link. The other end of this spring bears against the opposite end of the housing 63. The spring 68 itself is preferably inclosed in a suitable casing 69 carried by the housing 63. The crank 66, to which the link 64 is connected, is provided with a hub 70 (Figs. 16 and 17) freely rotatable on the end of the shaft 42 and having a circumferential slot 71 formed in it through which protrudes a stud or projection 72 fixed to the rocker shaft 42. The rocker shaft 42 is also provided with a laterally extending lug 73 having an arm 74 connected to a spring 75 carried on a supplemental supporting frame 76 (Fig. 6).

The operation of this sheaf delivering mechanism is as follows: When a sheaf is dropped upon the tripping finger 61 the trigger arm 60 is swung about in its bearings. This causes the rod 58 to be disengaged from the clutch arm 56. The clutch spring 57 then swings the pawl 54 into engagement with one of the studs 52 and the two members of the clutch are locked together in a well-known manner. The rotation of the shaft 8 is thus imparted to the shaft 46 and the movement of the latter is imparted to crank arm 66 through the resilient connection 62, 64, 68. As soon as the member 66 has moved through a sufficient angle to cause the end wall of the slot 71 in its hub to engage with the stud 72 on the rocker shaft 42, the rotation of the shafts 8 and 46 is transmitted to the rocker shaft 42 and through it to the sheaf delivery fork 43, causing the latter to swing upward and backward about its pivot from sheaf receiving position to sheaf delivering position. It is to be noted that the clutch is connected during a complete revolution of the shaft 46 and that while the clutch is still connected the pivotal connection between the latter and the crank 66 is thrown through a complete revolution, turning the latter about its pivot automatically in one direction f movement to drive the sheaf delivering fork to sheaf delivering position, and then automatically reversing the direction of movement to throw the fork back to sheaf receiving position ready for the next operation. It is further to be noted that in the movement of the fork from sheaf receiving to sheaf delivering position, and from sheaf delivering to sheaf receiving position, a certain amount of play is permitted between the fork and its driving mechanism due to the provision of the slot 71 in the hub 70, and that the fork 43 is independently movable by gravity relative to its driving mechanism after it passes the vertical position and its weight is displaced to one side of its pivot. By providing this play it is made possible to build up a shock under impact of the fork and other advantages are obtained, including the removal of deleterious shocks and jars in operating the mechanism and increased facility of separating the fork from the sheaf when the latter is being delivered to the cradle. It is to be noted that the spring 75 is automatically placed under tension as the fork moves to or returns from sheaf receiving position, so that this spring acts to restrain the movement of the fork in either direction, thus acting to assist in the cushioning of the fork and prevent the rebound of the same. This spring also performs another function; namely, that of accelerating the return of the fork from its limits of travel and at the same time also assists the spring 68 in the withdrawal of the fork tines from the sheaves as they are deposited in the cradle. Obviously, the clutch members 51 and 53 release each other automatically when the clutch arm 56 is again engaged by the trip 58 at the end of each complete revolution of the shaft 46 and to and fro movement of the sheaf delivery arm, so that the parts are thus automatically placed in position to be again operated when the next sheaf falls from the harvester deck. This operation of the sheaf delivering member 43 continues until the sheaf receiving cradle is filled, the fork being oscillated to and fro very rapidly through arcs of decreasing amplitude, and, as it builds up the shock, depositing the sheaves upon each other within the cradle with quick hammer-like blows and then being immediately and quickly returned to its sheaf receiving position.

Coöperating with the automatic mechanism for actuating the sheaf delivering fork in its movement to and from the cradle, and with the sheaf receiving cradle itself, is the automatic shock binding and compressing

Shock binding and compressing mechanism.

Both of these mechanisms are operated from the power shaft 8 and are arranged upon the sides of the sheaf receiving cradle at the back of the machine frame.

I will first describe the binding mechanism: As shown in Fig. 1, a gear 77 is loosely carried on the countershaft 8 and meshes with a gear 78 fixed on a longitudinally extending stub shaft 79 carried by the frame. This shaft is provided with a sprocket 80 near its rear end, which has a transversely extending chain connection 81 with a sprocket 82 carried by a longitudinally extending binder or knotter shaft 83. As shown, this knotter shaft extends substantially parallel with the cradle at one side of the same, and is journaled in a position substantially above the frame member 1. The shaft 83 operates a knotter 84, and also acts as a power shaft for the compressing mechanism and the sheaf discharging mechanism hereinafter described. The knotter 84 may be of any desired type; such, for instance, as the Appleby type, comprising a breastplate having a needle receiving slot 84$^1$ therein, and any preferred form of knot tying mechanism connected to a knotter operating wheel 84$^2$. Coöperating with the knot tying mechanism and operated by the knotter shaft 83 through transversely extending link connections 85, 86, 87 and a shaft 88, is a binding needle 89, operable upon rotation of the shaft 83 to move transversely across the sheaves in the cradle and coöperate with the knotter 84 upon the opposite side of the frame. Carried by this binding needle 89 is a chord-like, resilient, flexible, shock-compressing connection 89', preferably formed of sections of coiled spring and chain, which acts to remove deleterious strains from the needle and facilitate the binding operation, at the same time that it causes a substantially uniform pressure to be exerted upon shocks of varying size.

The operation of this binding mechanism is as follows: In the normal position of the needle 89 the twine fed out therefrom extends between the same and the knotter 84, as shown in Fig. 2, and across the cradle, so that the sheaves delivered to the latter carry the same to the bottom of the cradle. When the cradle is filled the binding mechanism is operated. Upon the rotation of the shaft 83, through the connection of the gear 78 to the countershaft 8, the links 85, 86, 87 and shaft 88 are actuated to throw the needle 89 about its pivot transversely across the frame at a point substantially midway between the ends of the sheaves. When the knot tying end of the needle passes through the knotter breastplate the twine is automatically tied about the sheaves in the cradle in a well-known manner to form the same into a shock. Upon the continued rotation of the knotter shaft 83 the parts are then automatically returned to their initial positions, the twine being cut in a well-known manner and the needle 89 being thrown backward about its pivot and feeding out the twine so that when the next sheaf is delivered by the sheaf delivering mechanism to the cradle, this sheaf will carry the twine to the bottom of the cradle and the sheaves subsequently delivered thereto will be deposited upon the top of the twine ready for the next binding operation.

The sheaf compressing mechanism coöperates with the sheaf binding mechanism, acting to remove the sheaves from the path of the binding needle during the binding operation, and at the same time compress the sheaves so that a more compact shock is produced and one which requires a smaller amount of twine to be used in the binding process.

This mechanism is likewise operated from the knotter or binder shaft 83 and is arranged to operate simultaneously with the binding needle 89. It comprises a cam 90 carried intermediate the ends of the shaft 83 and operable, when rotated by the shaft 83, to rock a compressor arm 91, journaled in the frame adjacent the knotter, about its pivot, as shown in Fig. 4, in such a manner as to compress the shock at a point in front of the knotter and force the grain out of the path of the needle. As illustrated, the compressor arm 91 and the binding needle 89 move in substantially parallel planes and are movable simultaneously in opposite directions, so that their action is substantially simultaneous during the binding operation. When the shaft 83 has turned through the desired movement; i. e., when the binding operation is completed, the arm 91 is swung backward to the dotted line position shown in Fig. 4 by any suitable means; as, for instance, a spring 92 (Fig. 5.)

The twine for the binding operation is supplied from a suitable twine receptacle or box 93, carried, preferably, upon the frame at the side of the cradle adjacent the pivot of the binding needle, and in such a position that the twine may be readily passed through the guides on the binding needle in the usual manner. Coöperating with the knot tying mechanism in the control of the twine, and operating to reduce the amount of twine required in the shock binding operation, is a tucker arm 94 movable across the inner face of the knotter breastplate.

This arm is secured to the inner end of a crank shaft journaled on the frame, having a crank 95 secured to its outer end which extends into the path of movement of a laterally extending pin 96 projecting outward from the knotter shaft 83, the tucker arm being automatically operable by said pin upon a predetermined rotation of the knotter shaft 83 to hold the twine in proper position for the knotter hook during the knotting operation. In order to return the tucker arm to its initial position after each operation of the same, a suitable spring 97 is provided.

After the shock has been compressed and bound in the cradle, it is then automatically discharged therefrom by the coöperating discharging mechanism.

*Shock discharging mechanism.*

This mechanism is automatically operated from the knotter shaft 83 and swings the sheaf receiving cradle to sheaf discharging position in such a manner that the bound sheaves therein are set butt end downward upon the ground in the shape of a shock.

This mechanism comprises suitable means operable to automatically turn the cradle about its horizontal axis to a substantially vertical position and release the end tines therefrom so that the shock may be deposited in a vertical position upon the ground and be left standing as the shocker is drawn forward. A crank arm 98 (Figs. 7 and 20) is carried upon the rear end of the knotter shaft 83 and pivotally connected, through a rod 99, with an arm or link 100 loosely journaled upon a rock shaft 101 journaled beneath the sheaf receiving cradle. A short crank 102, (Figs. 20, 21 and 22,) preferably formed integral with the rock shaft 101, protrudes substantially parallel to the arm 100 and is independently movable with respect thereto. This latter crank extends into the path of a gravity pawl 103 carried on the link 100, so that this pawl engages the crank 102 on the upstroke of that link.

When the crank arm 98 is rotated so that this arm or link 100 is moved downward, the crank 102 is pulled downward therewith, rocking the shaft 101 and throwing a laterally projecting portion thereof, 104, and roller 104¹, underlying the cradle, upward to a substantially vertical position. This movement causes the cradle to be tilted rearwardly with a quick upward throw into a substantially vertical position upon the rear of the frame wherein the shock is discharged therefrom. (Figs. 9 and 20.) Obviously, when the limit of the down stroke of the arm 100 is reached; i. e., when the cradle is dumping, the pawl 103 will be swung away by gravity from its engagement with the crank 102 and the cradle will then be free or disconnected from its tilting mechanism so that it may move independently thereof. Coöperating with the gravity pawl, I have, however, provided supplemental means for insuring the operation of the same, which comprises a spring 105, having one end attached to the free end of an arm 105¹, carried by the shaft 101, and having its other end fixed to the shocker frame. Obviously, when the link 99 is moved downward and the sheaf receiving cradle is drawn backward, this spring 105 assists in disengaging the pawl 103 from the crank 102 by imparting a slight downward movement to the latter. The spring 105 likewise performs another function; namely that of normally holding the roller 104¹ tight against the bottom of the cradle so that this roller acts as a means for cushioning the cradle when the latter is returned to sheaf receiving position.

Coöperating with this mechanism for automatically throwing the cradle to sheaf discharging position is automatic mechanism controlling the latching and unlatching of the end tines 39 thereof and operable to release these end tines as the cradle is turned about its axis to shock discharging position, and then automatically return the same to their normal position after each shock has been deposited upon the ground.

This mechanism includes a latching lever 106 (Fig. 12) pivotally and resiliently connected to the rear end of the cradle and engaging a catch 107 carried by the rocker shaft 38. This lever normally retains the tines 39 in a position at right angles to the cradle (Fig. 4). Coöperating with the lever 106 is a depending cam arm 108 that normally rests upon the bowed portion 4 of the axle 5. A lug 109, coöperating therewith, is likewise carried upon the bowed portion 4 of the axle and contacts with this cam arm at a predetermined time in the rotation of the shaft to lift the lever 106 from engagement with the catch 107.

This occurs during the operation of the cradle; i. e., when the same is being rocked rearward and is in an approximately vertical position. The result of this movement is to automatically release the rocker shaft 38 and tines 39. These tines are thus permitted to drop down and release the shock during the backward movement of the cradle and, assume the position shown in Fig. 9, beneath the shock, where they remain until after the shock has been discharged from the cradle and the latter has been returned to its initial position by means of a tension spring 110 carried on the shocker frame. The tines 39 are then drawn out from under the shock without disturbing the latter, by the continued forward movement of the shocker and returned to their initial position (Fig. 4) by a second tension spring 111 carried by the shocker frame. It is to be noted that both cradle and the tines are thus returned automatically to their initial positions ready to be again operated after the next shock is bound in the cradle.

In order that the sheaf delivering mechanism may not be operated during the operation of the sheaf compressing and binding mechanism and interfere with the operation of the latter, I provide automatic mechanism coöperating with the binding mechanism and operable to render the sheaf delivering mechanism inoperative during the shock compressing and binding operations.

*Mechanism rendering sheaf delivering mechanism inoperative.*

This mechanism is only operated during the compressing and binding operation, and is illustrated as operated by the binding needle 89 and controlling the connection of the sheaf delivering mechanism to the power shaft.

It comprises a spring connected plate spring 112 extending transversely of the shocker frame and fixed thereto, having its free end normally resting in the notched end of a rocking lever 113 pivotally connected to a support 114 also carried by the frame (Fig. 18). The free end of this spring is normally so supported by the links 86, 87 connecting the binding needle 89 to the knotter or binder shaft 83, that no tension is exerted on the lever 113. When, however, the needle 89 is moved to binding position, the links 86, 87 are withdrawn from beneath the spring and the latter is then free to exert tension upon the lever 113, and rock a latching arm 115 into engagement with the spring actuated pawl 54, (Figs. 6 and 17,) hereinbefore referred to, which controls the connection of the clutch 51, 53. In a preferred form the latching arm 115 is so pivotally mounted that it may be rocked into engagement with the pawl 54 to prevent the clutch members 51, 53 from being locked to the power shaft.

The effect of the operation of this spring 112 and latching arm 115, is, therefore, to automatically disconnect the sheaf delivering mechanism from the power connections when the binding needle 89 is operated, so that during the time the sheaves are being compressed, bound and discharged from the shocker no further sheaves are delivered to the cradle by the sheaf delivering mechanism. This is true even although at the time the lever 115 is operated a sheaf has just tripped the lever 60. When, however, the link connection 86, 87 is returned to its initial position upon the return of the binding needle 89 to its initial position (Fig. 2), the spring 112 is likewise returned to its initial position and the latching member 115 is released so that the parts are again in position to be operated when the next sheaf is ejected from the binder.

Coöperating with the other mechanisms hereinbefore described I also provide automatic mechanism controlling the sheaf compressing, binding and discharging mechanism and operating automatically to set the same in operation when a predetermined number of sheaves have been delivered to the sheaf receiving cradle.

*Sheaf counting mechanism.*

This mechanism is shown in the form of a ratchet and pawl counting wheel mechanism, and is automatically connected to the binding and other mechanism so that it sets the same in operation when a predetermined number of sheaves have been delivered to the sheaf receiving cradle.

It includes a counting wheel 116 (Figs. 7, 8 and 23) carried by the base frame and provided with peripheral teeth engaged by a pawl 117 carried by a rocking lever 118 pivotally connected to the shocker frame. This counting wheel controls the clutch controlling the connection of the gear 77 to the countershaft 8, and thus controls the connection between the binding and delivering mechanism and the power shaft, and also times this connection so that the binding mechanism is engaged after a predetermined number of sheaves have been deposited in the sheaf receiving cradle. In order to permit adjustment of this control, the lever 118 is also provided with a longitudinal series of openings or holes 119 which may be selectively engaged by a pivot bolt at one end of a connecting rod 120 connected at its other end to the crank arm 66 of the rocker shaft 42.

The clutch mechanism may obviously assume any well-known form. In the construction shown (Figs. 23, 24 and 25) the hub of the gear 77 is cut away to provide an abutment or shoulder $77^1$, and a rocking lever 121 is pivotally mounted on this gear and provided with a forked end $77^2$ that straddles the cut-away portion of the hub. This lever 121 projects beyond the periphery of the gear 77 and is provided with a laterally projecting lug 122. Coöperating therewith is a disk 123, fixed to the shaft 8 in spaced relation with the slotted portion of the hub of gear 77 and provided with an annular row of laterally projecting pins 124 which are adapted to engage the lug 122 and rock the lever 121, so that its forked end $77^2$ engages the abutment $77^1$ on the hub of the gear 77 and thereby causes the gear and disk 123 to rotate together. A spring 125 tends to hold the lever 121 in such position that its lug may be engaged by the pins 124, while the lever 121 is normally held disengaged from disk 123 by means of an angular rod 126 that is pivotally connected to the base frame and has one end projecting into the path of movement of a lug 127 projecting laterally from the counting wheel 116. In order to permit the shaft 79 to rotate through two complete revolutions while the shaft 83 is moving through one, a 2 to 1 gear being used, a pin 128 (Fig. 26) is provided on the shaft 83, which rocks member 129, pivoted to the frame, and through a link 130, raises the member 126 out of engagement with the pawl 121. To return the parts a spring 131 is provided.

The operation of this sheaf counting mechanism is as follows: The wheel 116 is rotated through a part of a revolution during the delivery of each sheaf to the sheaf receiving cradle. When a predetermined number of sheaves have been deposited in the cradle the lug 127 on the counting wheel trips the rod 126. This rod, in turn, connects the gear 77 to the power shaft 8 so that power is transmitted to the compressing, binding and discharging mechanism. Obviously, the number of sheaves, and therefore the size of the shock, to be deposited in the cradle may be regulated as desired by adjusting the rod 120 in the openings 119 in lever 118.

Operation of the complete machine.

The operation of the complete machine is entirely automatic, so that it is unnecessary for the operator of the harvester to assist in any way or at any time in the shocking of the grain.

Let us assume that the parts are in the positions shown in Figs. 1 and 2 and that the twine for the binding needle 89 extends between the latter and the knotter. When a sheaf is ejected from the binder deck it automatically sets the shocking mechanism in operation by tripping the member 60. This member controls the clutch 51, 54, which in turn controls the connection of the sheaf delivering mechanism to the power shaft. When the clutch is connected, the sheaf delivering fork 43 is thrown backward about its pivot, turning the sheaf end for end during its movement and delivering the same butt end rearward to the sheaf receiving cradle so that the butts of the sheaves are pierced by the tines 39. As the first sheaf moves downward in the cradle it carries with it the twine extending across the cradle so that the twine is beneath the sheaves as they are piled therein. This operation continues during the filling of the cradle, the sheaf delivery member moving successively through arcs of decreasing amplitude as it builds up the shock in the cradle. As each sheaf is delivered the counting wheel 116 is operated. When the desired number of sheaves has been deposited in the cradle the lug 127 on the counting wheel trips the rod 126, throwing the sheaf compressing, binding and discharging mechanism into operation through the gear 78 and knotter shaft 83. At the same time that the binding needle 89 is operated, through the action of the link connection 86, 87, the pivoted lever 113 and latching lever 115 are actuated to render the sheaf delivering fork 43 inoperative. By suitably timing the mechanism the compressing, binding and discharging mechanism may obviously be operated before the ejection of the next sheaf from the harvester. Further, as the needle 89 is thrown about its pivot to coöperate with the knotter 84, the compressor arm 91 is likewise thrown about its pivot by the cam 90, so that the compressor arm and binding needle are operated simultaneously. As soon as the sheaves are bound the binding needle and compressor arm are moved backward in opposite directions and toward their initial positions by the continued rotation of the knotter or binder shaft 83, and the sheaf discharging mechanism is operated through the link connection 98, 99, etc., to throw the sheaf receiving cradle backward about its pivot on the rear end of the frame. As the cradle is moved the end tines 39 thereof are automatically set free therefrom by means of the mechanism 109, 106, etc., so that as the cradle moves backward these tines drop away from the cradle and fall against the ground, permitting the sheaves to slip downward into a vertical position upon the ground. As soon as the shock is out of the cradle the latter is returned to its initial position by means of the spring 110, and as soon as the tines 39 clear the edge of the shock, due to the forward movement of the shocker, they are likewise returned to their initial position by means of the spring 111. During the operation of this mechanism the binding needle 89 has been moving back to its initial position and has acted upon the spring 112 to relieve the tension upon the lever 113 and cause the tripping lever 115 to disengage from the clutch finger and free the sheaf delivering mechanism so that the latter may again be connected to the power shaft ready to again deliver the sheaves to the cradle when the next sheaf trips the lever 60. It is to be noted that all the parts of the several mechanisms are automatically operated and automatically returned to their initial positions to form and discharge another shock.

In the operation of the device, it will also be noted that through the provision of my improved sheaf delivery mechanism, wherein the sheaf delivery member moves through arcs of gradually decreasing length as it builds up the shock, a very compact and solid shock is built which is well adapted to stand in the field, as compared with those machines wherein the sheaf is simply dropped in the receptacle. It will also be noted that through the provision of my improved sheaf delivery mechanism the capacity of the machine is materially increased and that the machine is adapted to handle light and fluffy grain which, when simply dropped into the receptacle, forms a shock having poor standing qualities. Obviously, also, through the packing of the sheaves a shock is formed which is better adapted to be bound by the needle. It will also be noted that through the provision of this improved sheaf delivery mechanism sheaves are carried down in their ultimate position in the receptacle so that there is no tendency for the sheaves to fly off by reason of centrifugal force, as is the case where the sheaf delivery member is stopped prior to the completion of the movement of the sheaf delivered. It is also obvious that the twine, which extends between the needle and the knotter, is carried down by the sheaf delivery member when delivering the first sheaf of each shock, means being thus provided which insure the proper location of the band and carry down the twine so that it can in no way interfere with the correct delivery of the first sheaf to the receptacle. Through the provision of my improved sheaf delivery mechanism, it is also to be noted that it is possible to build up a shock in the receptacle having an overhanging butt, that is, one in which the butts of the upper sheaves in the prostrate shock extend farther outward relative to the vertical and overhang the lower sheaves.

Attention is also directed to the fact that through the provision of the improved end gate or upstanding tined member employed herein, it is possible to have the butts of the sheaves extend beyond the end of the receptacle so that a considerable portion of them protrudes through the end tines. Through the provision of my improved dumping mechanism, it will also be noted that, after the receptacle has been tilted to substantially upright position, it may move independently of its operating mechanism and be returned instantaneously by its spring. Also, through the provision of the improved latch mechanism, the receptacle is given a very quick upward throw so that in coöperation with its spring returning mechanism it is operable practically instantaneously so that it may discharge a shock in the interval between the time that the sheaf delivery member is again made operative at the completion of the binding operation and the time that the sheaf delivery member delivers the next sheaf. Obviously, the capacity of the machine is thus increased, at the same time that the receptacle is always moved into position to receive the first sheaf in the next shock. By the provision of my improved construction of receptacle and end tines, it will also be noted that the receptacle and end tines may move independently of one another and the receptacle may be returned to normal position while the end tines are still under the shock, the latter being returned automatically and instantaneously when they are withdrawn from under the shock and not in any way retarding the return of the receptacle. Attention is also directed to the fact that in my improved construction the receptacle is pivoted at its extreme rear end to the frame and tilted upward and backward about its pivot in such a manner as to maintain the portion of the shock butt adjacent the pivot substantially stationary and move the head of the shock upward and rearward to such an extent as to neutralize the normal tendency of the shock to tilt forward as a result of the forward movement of the shocker in the field.

The mechanisms constituting the shocker coöperate with each other entirely automatically in the desired sequence. Further, they are automatically returned to their initial positions after each operation of the same. The machine shown is also rugged and simple in construction. It is, further, quick and reliable in its operation and forms an improved and sturdy shock well adapted to stand in the field. It is further to be noted that it is capable of adjustment, adapting it to handle grain of different qualities. These and many other advantages will readily appear to experts familiar with this art.

While, in order to disclose my invention fully and completely, I have shown one form of the same and specifically described the same herein, it is to be understood that my invention is not limited to the specific construction shown for purposes of illustration, but is susceptible of modification without departing from its spirit.

What I claim as my invention is:—

1. In a shocking machine, a shock receptacle, a pivoted shock building member delivering sheaves thereto, and operating means therefor whereby said member may swing through arcs of gradually decreasing amplitude as it builds up a shock in said receptacle.

2. In a shocking machine, a prostrate shock receptacle, a shock building member delivering sheaves prostrate therein, and driving connections for said member whereby the same is moved through a path of gradually decreasing length as it builds up a shock in said receptacle.

3. In a shocking machine, a frame, a normally prostrate tilting shock receptacle thereon, an upwardly and backwardly movable sheaf delivery member pivoted on said frame and delivering sheaves to said receptacle, and means whereby said member may move to different levels in said receptacle as it delivers the sheaves.

4. In a shocking machine, a frame, a sheaf delivery member pivoted thereon, driving mechanism for said delivery member, and means whereby said member may move independently of its driving mechanism during a portion of its movement.

5. In a shocking machine, a frame, a pivoted sheaf delivery member normally prostrate thereon, driving mechanism therefor whereby said member is moved to upright position, and means whereby said member may move independently of its driving mechanism after passing over its center.

6. In a shocking machine, a frame, a dumping shock receptacle thereon, a swinging sheaf delivery member, means for swinging the same through arcs of decreasing amplitude as it builds a shock, and shock receptacle dumping mechanism coöperating therewith automatically when a shock is built thereby.

7. In a shocking machine, a frame, a shock receptacle thereon, sheaf delivery mechanism including a sheaf delivery member movable through a path of gradually decreasing length as it builds up a shock in said receptacle, and shock binding mechanism carried on said frame and controlled by said sheaf delivery member.

8. In a shocking machine, a frame, a swinging sheaf delivery member pivoted thereon, a driving member engageable with said delivery member, and means whereby said delivery member may move independently of said driving member during a portion of its cycle of movement and during the remainder of said cycle be positively driven thereby.

9. In a shocking machine, a shaft, an oscillating sheaf delivery member pivoted thereon, rotating mechanism for said shaft, and a slot and pin connection between said shaft and delivery member.

10. In a shocking machine, a frame, a sheaf delivery member pivoted thereon and engageable therewith in sheaf receiving position, resilient driving means for said delivery member, and a spring connected between said member and frame for cushioning the same as it returns to sheaf receiving position.

11. In a shocking machine, a frame, a prostrate shock receptacle thereon, means including a sheaf delivery member for building up a prostrate shock under impact therein, and coöperating resilient means for disengaging said member from each sheaf delivered thereby, said member pressing the sheaves firmly together in the shock receptacle.

12. In a shocking machine, a frame, a sheaf delivery member pivoted thereon, driving mechanism therefor, means whereby said member may move independently of its driving mechanism during a portion of its delivery movement, and means for imparting a quick movement in an opposite direction to said member as it completes its independent movement.

13. In a shocking machine, a frame, a sheaf delivery member pivoted thereon, power connections for said delivery member, a resilient pitman operatively connected to said power connections and delivery member, and means whereby said member may move independently of said pitman.

14. In a shocking machine, a frame, a swinging sheaf delivery member pivoted thereon, a driving shaft, an extensible and contractible pitman operatively connected between said shaft and delivery member, and a compression spring operatively connected to the parts of said pitman.

15. In a shocking machine, a frame, a sheaf delivery member pivoted thereon, driving mechanism on said member including a resilient pitman, means whereby said member may move independently of its driving connection, and coöperating resilient means between said member and said frame controlling the movement of said member.

16. In a shocking machine, a frame, a pivoted sheaf delivering member thereon, mechanism for positively oscillating the same during a portion only of its movement about its pivot in opposite directions, and mechanism including a plurality of springs coöperating with said oscillating mechanism for cushioning said member at the limits of its travel and accelerating the return of the same therefrom.

17. In a shocking machine, a prostrate shock receptacle, a normally prostrate upwardly and backwardly swinging sheaf delivery member delivering sheaves thereto, means whereby said member is moved through a path of gradually decreasing length in building up a shock in said receptacle, and independent resilient means coöperating with said delivery member at each of its limits of movement.

18. In a shocking machine, a frame, a prostrate shock receptacle thereon, an upwardly and backwardly swinging sheaf delivery member pivoted to said frame and delivering sheaves to said receptacle, driving mechanism for said delivery member, means whereby said delivery member may move independently of its driving mechanism while delivering a sheaf, and means for preventing said delivering member from moving too far into said receptacle.

19. In a shocking machine, a frame, a shock receptacle pivoted thereon, a swinging sheaf delivering member pivoted to said frame and delivering sheaves to said receptacle, driving mechanism for said delivery member, means whereby said delivery member may move independently of its driving mechanism while delivering a sheaf, and resilient means for limiting the delivery movement of said delivery member and starting the same upon its return stroke.

20. In a shocking machine, a frame, a normally prostrate tilting shock receptacle pivoted to said frame, and an end-gate normally retained in upright position and pivoted at its bottom to the rear end of said receptacle, and means for releasing said end-gate as said receptacle is tilted.

21. In a shocking machine, a frame, a normally prostrate tilting shock receptacle pivoted to said frame, an upstanding end gate disposed at the rear end of said receptacle, and end gate latching mechanism normally retaining the same in upright position and automatically releasable from said end gate as said receptacle is tilted.

22. In a shocking machine, a frame, a shock receptacle pivoted thereto and reclining thereon, an upstanding end gate pivoted at the rear end of said receptacle, a latch pivoted to said receptacle and normally engaging said end gate, and means for releasing said latch as said receptacle is tilted about its pivot.

23. In a shocking machine, a frame, a shock receptacle pivoted thereto and reclining thereon, an upstanding end gate pivoted at the rear end of said receptacle, a latch pivoted to said receptacle and normally engaging said end gate, and means for releasing said latch including a depending member on said latch member engageable with a part of said frame as said receptacle is tilted.

24. In a shocking machine, a frame, a shock receptacle pivoted thereto and reclining thereon, an upstanding end gate pivoted at the rear end of said receptacle, a latch member pivoted on said receptacle and normally engaging said end gate, a resilient connection between said latch member and said receptacle, and means engageable with said latch member as said receptacle is tilted for releasing the same from said end gate.

25. In a shocking machine, a frame, a tilting shock receptacle normally reclining thereon, a member having transversely spaced upstanding end tines thereon pivotally mounted at the rear end of said receptacle, means normally holding said end tines in upstanding position relative to said receptacle, and means for releasing said last mentioned means as said receptacle turns about its pivot.

26. In a shocking machine, a frame, a shock receptacle pivoted thereto and reclining thereon, an upstanding end gate pivoted at the rear end of said receptacle, latch mechanism normally engaging said end gate, means for releasing said latch mechanism as said receptacle is tilted, and means for automatically returning said end gate to normal position and resetting said latching mechanism.

27. In a shocking machine, a frame, a normally prostrate tilting shock receptacle pivoted to said frame, an upstanding end gate pivoted at its bottom to the rear end of said receptacle, means normally retaining said end gate in upstanding position automatically releasable as said receptacle is tilted, and means for automatically returning said end gate to upstanding position and resetting said retaining means.

28. In a shocking machine, a frame, a tilting shock receptacle pivoted thereto and normally reclining thereon, an upstanding end gate pivotally connected at its lower end to the rear end of said receptacle, means normally holding said end gate in upstanding position releasable as said receptacle is tilted, and automatically acting means whereby said receptacle and end gate may be returned to normal position one independently of the other after a shock is set.

29. In a shocking machine, a normally prostrate shock receptacle, and sheaf impaling means carried in the bottom of said receptacle intermediate the ends thereof for definitely holding sheaves against lateral movement therein.

30. In a shocking machine, a frame, a shock receptacle pivoted thereto and normally reclining thereon, and a plurality of upstanding tines carried in the bottom of said receptacle intermediate the ends thereof and disposed on each side of its median line.

31. In a shocking machine, a frame, a shock receptacle pivoted thereto and normally reclining thereon, and a plurality of series of butt and head piercing tines extending upward from the bottom of said receptacle intermediate the ends thereof and disposed on opposite sides of its median line.

32. In a shocking machine, a frame, a shock receptacle pivoted thereto and normally reclining thereon, a plurality of upstanding tines carried in the bottom of said receptacle intermediate the ends thereof, means for tilting said receptacle, and means for returning said receptacle to normal position and automatically withdrawing said tines from the shock.

33. In a shocking machine, a frame, a normally prostrate shock receptacle pivoted thereon, upstanding head piercing tines carried in the bottom of said receptacle intermediate the ends thereof, and a plurality of upstanding transversely spaced end tines carried at the rear end of said receptacle.

34. In a shocking machine, a frame, a normally prostrate shock receptacle pivoted thereon, upstanding head piercing tines carried in the bottom of said receptacle, coöperating upstanding butt piercing tines carried in the bottom of said receptacle, and a plurality of upstanding transversely spaced end tines carried at the rear end of said receptacle.

35. In a shocking machine, a frame, a shock receptacle pivoted thereto and normally reclining thereon, mechanism for tilting said receptacle until it reaches upright position, and means whereby said receptacle may thereafter move independently of its tilting mechanism.

36. In a shocking machine, a frame, a shock receptacle pivoted thereto and normally reclining thereon, mechanism for tilting said receptacle to upright position, means whereby said receptacle may thereafter move independently of its tilting mechanism, and means for automatically returning said receptacle to its normal position.

37. In a shocking machine, a frame, a shock receptacle pivoted thereto and normally reclining thereon, mechanism for tilting said receptacle to upright position, means whereby said receptacle may thereafter move independently of its tilting mechanism, and resilient means for automatically returning said receptacle to its normal position.

38. In a shocking machine, a frame, a shock receptacle pivoted thereto and reclining thereon, operating mechanism for elevating said receptacle to upright position with a quick upward throw, and means for releasing said receptacle from its operating mechanism after it has reached its upright position.

39. In a shocking machine, a frame, a tilting shock receptacle pivoted thereto and normally reclining thereon, a power shaft journaled on said frame, and operative connections between said power shaft and said receptacle whereby said receptacle is tilted to upright position and then instantaneously released from said power shaft.

40. In a shocking machine, a frame, a tilting shock receptacle pivoted thereon, a power shaft journaled on said frame, operative connections between said power shaft and said receptacle whereby said receptacle is tilted to upright position and then instantaneously released from its power connections, and independent automatically acting means for returning said receptacle to its normal position.

41. In a shocking machine, a frame, a shock receptacle pivoted thereto and reclining thereon, operating mechanism for elevating said receptacle to upright position with a quick upward throw, means for instantaneously releasing said receptacle from its operating mechanism after it has reached its upright position, and resilient means for returning said receptacle to normal position.

42. In a shocking machine, a supporting frame having a portion thereof extending in close proximity to the ground, a tilting shock receptacle pivoted at its rear end thereto on said portion which extends in close proximity to the ground and normally reclining thereon, and means operating upon the bottom of said receptacle at a point at one side of its pivot for swinging said receptacle upward about its pivot.

43. In a shocking machine, a frame, a tilting shock receptacle pivoted thereto and normally reclining thereon, a pivoted arm journaled on said frame and disposed longitudinally beneath said receptacle, and means for swinging said arm about its pivot and thereby tilting said receptacle.

44. In a shocking machine, a frame, a shock receptacle pivoted thereto and normally reclining thereon, and receptacle tilting means pivoted to said frame and operating upon the bottom of said receptacle successively engageable with said receptacle at different points along its length as said means are operated to tilt said receptacle.

45. In a shocking machine, a frame, a tilting shock receptacle pivoted thereto and normally reclining thereon, an arm pivoted on said frame and disposed longitudinally beneath said receptacle, means for swinging the same about its pivot and thereby tilting said receptacle, and a roller connection between the free end of said arm and the bottom of said receptacle.

46. In a shocking machine, a frame, a tilting shock receptacle pivoted thereto and normally reclining thereon, an upwardly swinging arm pivoted to said frame and engageable with the bottom of said receptacle, means for swinging said arm upward about its pivot to tilt said receptacle, and means for causing said arm to cushion said receptacle upon its return movement.

47. In a shocking machine, a frame, a shock receptacle pivoted thereto and normally reclining thereon, a receptacle tilting member journaled on said frame beneath said receptacle having a longitudinally extending arm, means for intermittently rocking said tilting member to upright position, a resilient connection between said tilting member and said frame, and a resilient connection between said receptacle and said frame.

48. In a shocking machine, a frame, a tilting shock receptacle pivoted thereto and reclining thereon, a rocking receptacle tilting member disposed beneath said receptacle, a power shaft carried on said frame, a link connection having one end operatively connected to said shaft and its opposite end pivoted on said frame, and a gravity latch carried on said link connection and engageable with said tilting member.

49. In a shocking machine, a frame, a tilting shock receptacle pivoted thereto and reclining thereon, a rocking receptacle tilting member disposed beneath said receptacle and having a lateral extension thereon, a power shaft on said frame, a link connection connected to said power shaft and journaled on said tilting member, and a gravity latch member carried on said link connection and engageable with the extension on said tilting member.

50. In a shocking machine, a frame, a tilting shock receptacle pivoted thereto, a rotatable shaft on said frame, a crank on said shaft, a tilting member journaled on said frame having a plurality of arms thereon, one being disposed beneath said receptacle, a link journaled on said tilting member, a link connecting said link to said crank, and a gravity latch carried on said first mentioned link and engageable with the other arm on said tilting member.

51. In a shocking machine, a frame, a tilting shock receptacle pivoted thereto, a rotatable shaft on said frame, a crank on said shaft, a tilting member journaled on said frame having a plurality of arms thereon, one of the same being disposed beneath said receptacle, a link connection journaled on said tilting member and connected to said crank, a gravity latch carried on said link connection and engageable with and disengageable from the other arm on said tilting member as said shaft is rotated, and a resilient connection between said tilting member and said frame.

52. In a shocking machine, a frame, a tilting shock receptacle pivoted thereto, a rotatable shaft on said frame, a crank on said shaft, a tilting member journaled on said frame having a plurality of arms thereon, one of the same being disposed beneath said receptacle, a link connection journaled on said tilting member and connected to said crank, a gravity latch carried on said connection and engageable with the other tilting member arm, and a resilient connection between said receptacle and said frame.

53. In combination, a shocker frame, a sheaf delivery member pivoted thereto and normally reclining thereon, and means independent of said sheaf delivery member for preventing a sheaf thrown in a lateral direction above said delivery member from passing beyond the same.

54. In combination, a shocker frame, a sheaf delivery member pivoted thereto and normally reclining thereon, and an upstanding member disposed at one side of said delivery member engageable with a sheaf thrown laterally over said delivery member.

55. In combination, a shocker frame, a sheaf delivery member pivoted thereto and normally reclining thereon, an upstanding member disposed at one side of said delivery member and engageable with a sheaf thrown laterally over said delivery member, operating mechanism for said delivery member, and controlling means for said operating mechanism engageable by a sheaf as it is delivered to said delivery member.

56. In a shocking machine, a frame, a swinging sheaf delivery member pivoted thereon and movable relative thereto, operating mechanism for said member, and means for retaining a sheaf on said member including a plurality of series of transversely spaced sheaf piercing tine members longitudinally spaced along the free end of said delivery member.

57. In a shocking machine, a frame, a swinging sheaf delivery member pivoted thereon and movable relative thereto, operating mechanism for said member, and means for retaining a sheaf on said member including a plurality of series of transversely spaced sheaf piercing tine members longitudinally spaced along the free end of said delivery member and a tine disposed adjacent certain of said tine members.

58. In a shocking machine, a frame, a pivoted swinging sheaf delivery member, operating mechanism therefor, and means for retaining a sheaf thereon including a plurality of series of transversely spaced sheaf piercing tine members longitudinally spaced along the free end thereof, and coöperating tines disposed in front and rear of certain of said transversely spaced tine members.

59. In a shocking machine, a sheaf delivery member including a shank having a plurality of longitudinally spaced transversely extending upstanding substantially U-shaped sheaf piercing tines at its free end and a plurality of straight upstanding tines fixed to said shank on opposite sides of one of said U tines.

60. In a shocking machine, a frame, a shock receptacle thereon, a knotter carried on one side of said receptacle, a coöperating needle operatively connected to the knotter and carried at the opposite side of said receptacle, and automatically acting means for moving the material of the shock adjacent said knotter out of the path of said needle.

61. In a shocking machine, a frame, a shock receptacle thereon, a knotter carried at one side of said receptacle, a coöperating needle operatively connected to the knotter and carried at the opposite side of said receptacle, and means movable in timed relation with said needle for compressing the shock at a point in front of said knotter.

62. In a shocking machine, a frame, a shock receptacle thereon, a knotter carried at one side of said receptacle, a coöperating needle operatively connected to the knotter and carried at the opposite side of said receptacle, a compressor arm pivoted on said frame adjacent said knotter, and means for moving said needle and compressor arm in opposite directions.

63. In a shocking machine, a frame, a shock receptacle thereon, knotter mechanism carried at one side of said receptacle, a binding needle operatively connected to said knotter mechanism and carried on the opposite side of said receptacle, a compressor arm pivoted adjacent said knotter, and a cam member operatively connected to said knotter mechanism and engageable with said compressor arm.

64. In a shocking machine, a frame, a shock receptacle carried thereon, a knotter shaft disposed parallel to said receptacle, knotter mechanism connected to said shaft, a needle coöperating with said knotter and journaled on said frame on the opposite side of said receptacle, a compressor arm pivotally mounted on said frame adjacent said knotter having a laterally extending portion, and a cam carried on said knotter shaft and engageable with said laterally extending portion.

65. In a shocking machine, a frame, a shock receptacle thereon, knotter mechanism disposed at one side of said receptacle, a needle operatively connected to said knotter and disposed at the opposite side of said receptacle, and means carried by said needle whereby uniform pressure is exerted on shocks of varying size.

66. In a shocking machine, a frame, a shock receptacle thereon, knotter mechanism disposed at one side of said receptacle, a needle operatively connected to said knotter and disposed at the opposite side of said receptacle, and a chord-like resilient connection carried by said needle.

67. In a shocking machine, a frame, a shock receptacle thereon, knotter mechanism disposed at one side of said receptacle, a needle operatively connected to said knotter and disposed at the opposite side of said receptacle, and a flexible chord-like connection carried on said needle comprising resilient and non-resilient elements.

68. In a shocking machine, a frame, a shock receptacle thereon, sheaf delivery mechanism including a sheaf delivery member pivoted on said frame in front of said receptacle and movable upwardly and rearwardly to deliver a sheaf therein, mechanism for binding a shock in said receptacle, and means controlled by said binding mechanism for rendering said delivery member inoperative.

69. In a shocking machine, a frame, a shock receptacle thereon, sheaf delivery mechanism including a sheaf delivery member pivoted to said frame in front of said receptacle movable upward and rearward to deliver a sheaf therein, a knotter and a needle carried on opposite sides of said receptacle, link connections between the same, and means engageable by said link connections controlling the operation of said delivery member.

70. In a shocking machine, a frame, a shock receptacle thereon, sheaf delivery mechanism delivering sheaves thereto including a clutch, a knotter and a needle carried on opposite sides of said receptacle, operative connections between said elements, and means operable by said operative connections and engageable with said clutch controlling the operation of said delivery mechanism.

71. In a shocking machine, a frame, a shock receptacle thereon, sheaf delivery mechanism delivering sheaves thereto including a clutch having a rotatable dog, a knotter and a needle carried on opposite sides of said receptacle, operative connections between said elements, and means including a member resiliently mounted on said frame and engageable with said operative connections controlling the rotation of said dog.

72. In a shocking machine, a frame, a shock receptacle carried thereon, automatic sheaf delivery mechanism including a swinging sheaf delivery member delivering sheaves thereto, mechanism for binding a shock in said receptacle, mechanism controlled by said binding mechanism for holding said delivery mechanism inoperative during the binding operation only, and automatically acting means for discharging a bound shock before said delivery member delivers another sheaf.

73. In a shocking machine, a frame, an upwardly and backwardly tilting shock receptacle pivoted thereto and reclining thereon, automatic sheaf delivery mechanism including a sheaf delivery member pivoted on said frame in front of said receptacle and movable upwardly and backwardly to deliver sheaves prostrate therein, mechanism for binding a shock in said receptacle, means for rendering said sheaf delivery member inoperative during the binding operation only, and instantaneously operating mechanism for tilting said receptacle upon the completion of the binding operation and returning said receptacle to normal position prior to the delivery of the next sheaf by said delivery member.

74. In a shocking machine, a frame, a shock receptacle pivoted at its extreme rear end to said frame and normally reclining thereon, a power shaft, means for tilting said receptacle operatively connected to said shaft, means for releasing said tilting means from said power shaft when said receptacle is in upright position, and means in which power is stored during the tilting operation of said receptacle for returning the latter to normal position.

75. In a shocking machine, a frame, a shock receptacle pivoted thereto and normally reclining thereon, and means for building up therein a prostrate shock having an overhanging butt.

76. In a shocking machine, a frame, a shock receptacle pivoted thereto and normally reclining thereon, mechanism for building up therein a prostrate shock having an overhanging butt, and means for tilting said receptacle to substantially upright position.

77. In a shocking machine, a frame, a shock receptacle pivoted thereto and normally reclining thereon, normally upstanding end tines pivoted at the rear end of said receptacle, means for building up a prostrate shock in said receptacle delivering sheaves thereto with their butts protruding a substantial distance through said tines, and means for tilting said receptacle about its pivot.

78. In a shocking machine, a frame, a shock receptacle thereon, a shaft carried on said frame, shock binding and dumping mechanism connected to said knotter shaft, a second shaft journaled on said frame, operative connections between said shafts whereby said last mentioned shaft makes a plurality of revolutions to one of said knotter shaft, mechanism for driving said second shaft including a clutch mechanism, and means connected to said knotter shaft controlling the connection of said clutch mechanism.

79. In a shocking machine, a frame, a shock receptacle thereon, a shaft carried on said frame, shock binding mechanism connected to said knotter shaft, shock dumping mechanism connected to said knotter shaft, a second shaft journaled on said frame, operative connections between said shafts whereby said last mentioned shaft makes a plurality of revolutions to one of said knotter shaft, mechanism for driving said second shaft including a clutch mechanism, a cam carried on said knotter shaft, and clutch controlling connections controlled by said cam.

80. In a shocking machine, a frame, a rearwardly dumping sheaf receiving cradle supported thereby, gear mechanism connected with said cradle for tilting the same to upright position, a traction wheel, means for connecting said gear mechanism therewith, a sheaf delivering member pivotally mounted forward of the cradle for depositing bundles therein, tripping mechanism operatively connected with said gear mechanism, gear mechanism operatively connected with said wheel, and delivering mechanism for operating the latter, and means for releasing the sheaf delivering gear mechanism and thereby the sheaf delivering member.

81. A grain shocker attachment for harvesters having, in combination, a wheeled frame, traction wheels having said frame mounted thereon, means whereby said frame may be attached to a harvester in a manner to trail in rear thereof, a rocking shock setter frame mounted upon the rear end of said wheeled frame in a manner permitting an upward and rearward rocking movement thereof, a horizontally arranged rock shaft journaled in bearings secured to said wheeled frame and arranged transversely thereon relative to the line of draft of the machine, power transmitting means operatively connecting said shaft with said traction wheels in a yielding manner whereby said shaft is given a variable to and fro rocking movement in the direction of the line of draft of the machine, a fork having a carrying arm secured to said shaft and adapted to receive sheaves from a harvester and to carry the same upward and rearward in substantially a vertical plane and deliver said sheaves to said setter frame, said fork having a limited angular movement in a fore and aft direction independent of said power transmitting mechanism.

82. A grain shocker attachment for harvesters having, in combination, a wheeled frame, traction wheels having said frame mounted thereon, means whereby said frame may be attached to a harvester in a manner to trail in rear thereof, a rocking shock setter frame mounted upon the rear end of said wheeled frame in a manner permitting an upward and rearward rocking movement thereof, a horizontally arranged rock shaft journaled in bearings carried by said wheeled frame and arranged transversely thereon relative to the line of draft of the machine, an arm secured to said shaft, in a manner permitting said arm to have a limited angular movement independent of said shaft, power transmitting means operatively connecting said arm with said traction wheels whereby said shaft is given a to and fro rocking movement in the direction of the line of draft of the machine, said means including an intermittently operating clutch mechanism, and a yielding link connection between said arm and said clutch mechanism, a fork having a carrying arm secured to said rock shaft, said fork being adapted to receive sheaves from a harvester and to carry the same upward and rearward in a substantially vertical plane and deliver said sheaves to said setter frame with the butts thereof directed rearward, and means actuated by a sheaf delivered from the harvester and operative to trip said clutch mechanism into action.

83. A grain shocker attachment for harvesters having, in combination, a wheeled frame, carrying wheels having said wheeled frame mounted thereon, means whereby said wheeled frame may be attached to a harvester in a manner to trail in rear thereof, a rocking shock setter frame mounted upon the rear end of said wheeled frame in a manner permitting an upward and rearward rocking movement thereof in a vertical plane, a rock shaft journaled in bearings carried by the rear end of said setter frame and arranged transversely thereon, tines secured to said shaft, a spring mechanism connected with said shaft and operative in a manner whereby said tines are normally turned to a vertical position across the discharge end of said setter frame when the latter is in a prostrate position, means for delivering sheaves of grain to said setter frame, and means for automatically rocking said setter frame in a manner to deposit a shock upon the ground.

84. A grain shocker attachment for harvesters having, in combination, a wheeled frame, carrying wheels having said wheeled frame mounted thereon, means whereby said wheeled frame may be attached to a harvester in a manner to trail in the rear thereof, a rocking shock setter frame mounted upon the rear end of said wheeled frame in a manner permitting an upward and rearward rocking movement thereof in a vertical plane, a rock shaft journaled in bearings carried by the rear end of said setter frame and arranged transversely thereon, tines secured to said shaft and normally retained in a vertical position across the discharge end of said setter frame when the latter is in a sheaf receiving position, means for delivering sheaves of grain from a harvester to said setter frame, means automatically operative for rocking said setter frame in a manner to deposit a shock upon the ground, and means permitting the return of said setter frame to a sheaf receiving position independent of said tines.

85. A grain shocker attachment for harvesters having, in combination, a wheeled frame, carrying wheels having said frame mounted thereon, means whereby said wheeled frame may be attached to a harvester in a manner to trail in rear thereof, a rocking shock setter frame mounted upon the rear end of said wheeled frame in a manner permitting an upward and rearward rocking movement thereof in a vertical plane, a rock shaft journaled in bearings carried by the rear end of said setter frame and arranged transversely thereon, tines secured to said shaft, said tines being normally retained in a vertical position across the discharge end of said setter frame when the latter is in a sheaf receiving position, means for delivering sheaves of grain from a harvester to said setter frame, positively and automatically operating means for rocking said setter frame to a vertical position to discharge a shock therefrom, and a tension spring having one end thereof connected with a fixed part of the machine and the opposite end thereof connected with said setter frame and operative to return said setter frame to its initial position independent of said tines.

86. A grain shocker attachment for harvesters having, in combination, a wheeled frame, carrying wheels having said frame mounted thereon, means whereby said wheeled frame may be attached to a harvester in a manner to trail in rear thereof, a rocking shock setter frame mounted upon the rear end of said wheeled frame in a manner permitting an upward and rearward rocking movement thereof in a vertical plane, a rock shaft journaled in bearings carried by the rear end of said setter frame and arranged transversely thereon, tines secured to said shaft, means for retaining said tines in a vertical position across the discharge end of said setter frame when the latter is in a sheaf receiving position, said means comprising a catch arm secured to said rock shaft, a spring-pressed latch member having one end adapted to engage with said catch arm, and the opposite end thereof pivotally connected with said setter frame, and means for releasing said latch member when said setter frame is rocked to a vertical position.

87. A grain shocker attachment for harvesters having, in combination, a wheeled frame, carrying wheels having said frame mounted thereon, means whereby said wheeled frame may be attached to a harvester in a manner to trail in rear thereof, a rocking shock setter frame mounted upon the rear end of said wheeled frame in a manner permitting an upward and rearward rocking movement thereof in a vertical plane, a rock shaft journaled in bearings carried by the rear end of said setter frame and arranged transversely thereon, tines secured to said shaft, means for retaining said tines in a vertical position across the rear end of said setter frame when the latter is in a sheaf receiving position, said means comprising a catch arm secured to said rock shaft, a spring-pressed latch member having one end thereof adapted to engage with said catch arm and the opposite end thereof pivotally connected with said setter frame, said latch member being provided with a pendent cam arm, a lug carried by a fixed part of the wheeled frame and adapted to engage with said pendent cam in a manner to release said latch member when said setter frame is rocked to a vertical position.

88. A grain shocker attachment for harvesters having, in combination, a wheeled frame, carrying wheels having said frame mounted thereon, means whereby said wheeled frame may be attached to a harvester in a manner to trail in rear thereof, a rocking shock setter frame mounted upon the rear end of said wheeled frame in a manner permitting an upward and rearward rocking movement thereof in a vertical plane and to substantially a vertical position, a rock shaft journaled in bearings carried by the rear end of said setter frame and arranged transversely thereon, tines secured to said rock shaft, releasable means operative in a manner to rigidly retain said tines in a vertical position across the discharge end of said setter frame when the latter is in a sheaf receiving position, means operative to release said tine retaining means when said setter frame has been rocked to a shock discharging position, and a tension spring operatively connected with a fixed part of the machine and said tine mechanism whereby said tines are returned to a vertical position when a shock has been discharged.

89. A grain shocker attachment for harvesters having, in combination, a wheeled frame, carrying wheels having said frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and to substantially a vertical position, a rock shaft journaled in bearings secured to said setter frame and arranged transversely thereon, tines secured to said rock shaft, releasable means carried by said setter frame and operative in a manner to rigidly retain said tines in a vertical position when said setter frame is in a sheaf receiving position, means mounted upon a fixed part of the machine and operative to release said retaining means when said setter frame is rocked to a shock discharging position, and a tension spring operatively connected with a fixed part of the machine and said tine mechanism, whereby said tines are returned to a vertical position after a shock has been discharged.

90. A grain shocker attachment for harvesters including, in combination, a wheeled frame, carrying wheels having said frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and to substantially a vertical position, a horizontally arranged rock shaft journaled in bearings secured to said wheeled frame and arranged transversely thereon relative to the line of draft of the machine, a fork having an arm secured to said rock shaft, a crank arm mounted upon said rock shaft in a manner permitting a limited angular movement thereof independent of a rocking movement of said shaft, power transmitting means operatively connected with said crank arm, said means including an intermittently operating clutch mechanism having clutch tripping mechanism connected therewith, and means actuated by a sheaf delivered to said fork, said means being operatively connected with said clutch tripping mechanism.

91. A grain shocker attachment for harvesters including, in combination, a wheeled frame, carrying wheels having said frame mounted thereon, means whereby said wheeled frame may be attached to a harvester in a manner to trail in rear thereof, a rocking shock setter frame mounted upon the rear end of said wheeled frame in a manner permitting an upward and rearward rocking movement thereof in a vertical plane and to substantially a vertical position, a horizontally arranged rock shaft journaled in bearings secured to said setter frame and arranged transversely thereon relative to the line of draft of the machine, a fork having an arm secured to said rock shaft, a crank arm having a hub portion loosely mounted upon said rock shaft, said hub portion having a circumferential slot therein, a stud on said rock shaft received by said slot in a manner permitting a limited angular movement of said crank arm independent of a rocking movement of said shaft, power transmitting means operatively connected with said crank arm, said means including an intermittently operating clutch mechanism having clutch tripping mechanism connected therewith, and means actuated by a sheaf delivered to said fork, said means being operatively connected with said clutch tripping mechanism.

92. A grain shocker attachment for harvesters having, in combination, a wheeled frame, carrying wheels having said frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and to substantially a vertical position, means for delivering sheaves from a harvester to said setter frame in a manner having the butts thereof directed rearward, means for binding the sheaves into a shock, said means comprising a needle arm, a rock shaft journaled in bearings carried by said wheeled frame at one side of said setter frame and having said needle arm secured thereto, a knotter actuating shaft journaled in bearings carried by said wheeled frame upon the opposite side of said setter frame, knot tying mechanism connected with said shaft, means whereby said knotter actuating shaft is operated intermittently, power transmitting mechanism connecting said knotter actuating shaft with said needle operating shaft, means for positively rocking said setter frame to a vertical position, said means being operatively connected with said knotter actuating shaft, and a tension spring mechanism operative to return said setter frame to its initial position.

93. A grain shocker attachment for harvesters having, in combination, a wheeled frame, carrying wheels having said frame mounted thereon, means whereby said wheeled frame may be attached to a harvester in a manner to trail in rear thereof, a rocking shock setter frame mounted upon the rear end of said wheeled frame in a manner permitting an upward and rearward rocking movement thereof in a vertical plane and to substantially a vertical position, means for delivering sheaves from a harvester to said setter frame in a manner having the butts thereof directed rearward, means for binding the sheaves into a shock, said means comprising a needle arm, a rock shaft journaled in bearings carried by said wheeled frame at one side of said setter frame, and having said needle arm secured thereto, a knotter actuating shaft journaled in bearings carried by said wheeled frame upon the opposite side of said setter frame, knot tying mechanism connected with said shaft, means whereby said knotter actuating shaft is operated intermittently, power transmitting mechanism connecting said shaft with said needle operating shaft, a crank arm secured to said knotter actuating shaft, a transversely arranged rock shaft journaled in bearings carried by said wheeled frame and having an arm extending in a fore and aft direction relative to the advance of the machine, said crank arm engaging with said setter frame in a manner to rock said frame to a vertical position when said rock shaft is turned in one direction, said rock shaft being operatively connected with said crank arm secured to said knotter actuating shaft whereby said rock shaft is positively turned in a direction to raise said setter frame, and a spring mechanism operative to turn said shaft in an opposite direction.

94. A grain shocker attachment for harvesters having, in combination, a wheeled frame, carrying wheels having said frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and to substantially a vertical position, means for delivering sheaves from a harvester to said setter frame in a manner having the butts thereof directed rearward, means for binding the sheaves into a shock, said means comprising a needle arm, a rock shaft journaled in bearings carried by said wheeled frame at one side of said setter frame, and having said needle arm secured thereto, a knotter actuating shaft journaled in bearings carried by said wheeled frame upon the opposite side of said setter frame, knot tying mechanism connected with said shaft, means whereby said knotter actuating shaft is operated intermittently, power transmitting mechanism connecting said shaft with said needle operating shaft, a crank arm secured to said knotter actuating shaft, a transversely arranged rock shaft journaled in bearings carried by said wheeled frame and having an arm integral with one end thereof and extending in a fore and aft direction relative to the advance of the machine, said arm engaging with said setter frame in a manner whereby said frame is rocked to a vertical position when said shaft is turned in one direction, means for rocking said shaft in a manner to raise said setter frame, said means comprising a crank arm integral with the opposite end of said rock shaft, an arm loosely mounted upon said shaft adjacent said crank arm, a pawl carried by said loosely mounted arm and adapted to engage with said fixed crank arm when said loosely mounted arm is moved in one direction, a link connection between said loosely mounted arm and said crank arm and secured to said knotter actuating shaft, and a spring mechanism operative to turn said rock shaft in an opposite direction.

95. A grain shocker attachment for harvesters having, in combination, a wheeled frame, carrying wheels having said frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and to substantially a vertical position, means for delivering sheaves from a harvester to said setter frame in a manner having the butts thereof directed rearward, said means comprising a transversely arranged rock shaft journaled in bearings carried by said wheeled frame, a fork having an arm secured to said rock shaft, said means for actuating said rock shaft, said means including an intermittently operating clutch mechanism, said clutch mechanism having clutch tripping means connected therewith, means actuated by a sheaf delivered from the harvester to said fork and operative in a manner to control said clutch tripping means, means for binding the sheaves into a shock, said means comprising a rock shaft journaled in bearings carried by said wheeled frame at one side of said setter frame, a needle arm secured to said rock shaft, a knotter actuating shaft journaled in bearings carried by said wheeled frame upon the opposite side of said setter frame, knot tying mechanism connected with said shaft, means whereby said knotter actuating shaft is operated intermittently, power transmitting means connecting said knotter actuating shaft with said needle operating shaft, and means for suspending the operation of said clutch tripping means, said means being controlled by a rocking movement of said needle operating shaft.

96. A grain shocker attachment for harvesters having, in combination, a wheeled frame, carrying wheels having said frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and to substantially a vertical position, means for delivering sheaves from a harvester to said setter frame in a manner having the butts thereof directed rearward, said means comprising a transversely arranged rock shaft journaled in bearings carried by said wheeled frame, a fork having an arm secured to said rock shaft, means for actuating said rock shaft, said means including an intermittently operating clutch mechanism, said clutch mechanism including a constantly rotating clutch member, an intermittently rotating clutch member having a clutch pawl mounted thereon and adapted to engage with said constantly rotating clutch member, a clutch controlling lever pivotally mounted upon a fixed part of the machine and adapted to engage with said pawl in a manner to disengage said pawl from said constantly rotatable clutch member, a trigger rod mounted upon said wheeled frame and having one end thereof connected with said clutch controlling lever in a manner to release it from engagement with said clutch pawl when said trigger rod is moved in one direction, an arm on said trigger rod arranged within the path of a sheaf delivered from the harvester whereby the movement of the sheaf trips said clutch mechanism into operation, means for binding the sheaves into shocks, said means comprising a rock shaft journaled in bearings carried by said wheeled frame at one side of said setter frame, a needle arm secured to said rock shaft, a knotter actuating shaft journaled in bearings carried by said wheeled frame upon the opposite side of said setter frame, knot tying mechanism connected with said shaft, means whereby said knotter shaft is operated intermittently, a crank arm secured to said knotter actuating shaft, a crank arm secured to said needle operating shaft, a link connection between said crank arms, a spring-pressed lever having one end secured to a fixed part of the machine and the opposite end thereof engaging with said arm secured to said needle operating shaft, a supplemental clutch controlling lever pivotally mounted upon said wheeled frame and adapted to engage with said clutch pawl, and a connection between said spring-pressed lever and said supplemental clutch controlling lever whereby said crank arm secured to said needle shaft controls the movement of said lever.

97. A grain shocker attachment for harvesters having, in combination, a wheeled frame, carrying wheels having said wheeled frame mounted thereon, a tiltable setter frame carried by said wheeled frame, means for delivering sheaves to said setter frame, mechanism including a knotter shaft for binding the sheaves into shocks while in said setter frame, a lifting arm for tilting said setter frame in a manner to discharge a shock therefrom, a crank arm secured to said knotter shaft, a crank carried by said lifting arm, a link connection between said cranks, and a spring mechanism operative to return said setter frame to a sheaf receiving position.

98. A grain shocker attachment for harvesters having, in combination, a wheeled frame, carrying wheels having said wheeled frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and from substantially a horizontal to substantially a vertical position, means for delivering sheaves from a harvester to said setter frame in a manner whereby the butts thereof are directed rearward, said means including a sheaf carrier pivotally mounted upon said wheeled frame in a manner permitting an upward and rearward swinging movement thereof in a vertical plane, means carried by said trailing wheeled frame for automatically and intermittently actuating said sheaf carrier through a part only of its swinging movement in opposite directions, said means including an intermittently operating clutch mechanism and a reciprocating link connection between said clutch mechanism and said arm, said arm having a degree of angular movement greater than said link in opposite directions, and other means carried by said trailing wheeled frame for automatically and intermittently actuating said shock setter frame.

99. A grain shocker attachment for harvesters having, in combination, a wheeled frame, carrying wheels having said wheeled frame mounted thereon, means whereby said wheeled frame may be connected with a harvester in a manner to trail in rear thereof, a rocking shock setter frame mounted upon the rear end of said wheeled frame in a manner permitting an upward and rearward rocking movement thereof in a vertical plane and from substantially a horizontal to substantially a vertical position, means for delivering sheaves from a harvester to said setter frame in a manner whereby the butts thereof are directed rearward, means including a sheaf carrier comprising a fork having an arm pivotally connected with said wheeled frame in a manner permitting said fork to swing upward and rearward in a vertical plane into said setter frame, means carried by said trailing wheeled frame for automatically and intermittently actuating said fork through a part only of its swinging movement, said means including an intermittently operating clutch mechanism and a reciprocating link connection between said clutch mechanism and said arm, said arm having a degree of angular movement greater than said link in opposite directions, a spring operative to retard the movement of said fork as it nears the limit of the rearward movement thereof, means automatically rendering said fork inoperative after a predetermined number of sheaves have been delivered thereby, and means carried by said trailing wheeled frame for automatically and intermittently actuating said setter frame.

100. A grain shocker attachment for harvesters having, in combination, a wheeled frame, carrying wheels having said wheeled frame mounted thereon, means whereby said wheeled frame may be connected with a harvester in a manner to trail in rear thereof, a rocking shock setter frame mounted upon the rear end of said wheeled frame in a manner permitting an upward and rearward tilting movement thereof in a vertical plane and from approximately a horizontal to substantially a vertical position, means for delivering sheaves to said setter frame in a manner having the butts thereof directed rearward, said means including a sheaf carrier comprising a fork having an arm, a horizontally and transversely arranged rock shaft journaled in bearings carried by said wheeled frame, said fork arm being secured to said rock shaft in a manner permitting said fork to swing upward and rearward in a vertical plane from the sheaf delivery side of a harvester to said setter frame, means carried by said wheeled frame for automatically and intermittently rocking said shaft through a part only of its angular movement, in opposite directions, said means including an intermittently operating clutch mechanism and a reciprocating link connection between said clutch mechanism and said arm, said arm having a degree of angular movement greater than said link in opposite directions, a tension spring having one end thereof connected with a fixed part of the machine, an arm secured to said rock shaft and having the opposite end of said spring connected therewith whereby said spring is operative to yieldingly resist a downward swing of said fork as it swings to a sheaf delivering position, and means carried by said trailing wheeled frame for automatically and intermittently actuating said setter frame.

101. A grain shocker attachment for harvesters having, in combination, a wheeled frame, carrying wheels having said wheeled frame mounted thereon, means whereby said wheeled frame may be connected with a harvester in a manner to trail in rear thereof, a rocking shock setter frame mounted upon the rear end of said trailing wheeled frame in a manner permitting an upward and rearward tilting movement thereof in a vertical plane and from approximately a horizontal to a vertical position, said setter frame including a central plate, side plates disposed upon opposite sides of said central plate and spaced apart therefrom, upstanding and outwardly bowed guard wings upon opposite sides of said setter frame, a transversely arranged plate connecting the forward ends of said central and side plates, a transversely arranged arched rest bar secured to said wheeled frame and adapted to support the front end of said setter frame when the same is in a sheaf receiving position, and means carried by said trailing wheeled frame and operative to automatically and intermittently tilt said setter frame.

102. A grain shocker attachment for harvesters having, in combination, a wheeled frame, carrying wheels having said wheeled frame mounted thereon, means whereby said wheeled frame may be connected with a harvester in a manner to trail in rear thereof, a rocking shock setter frame mounted upon the rear end of said wheeled frame in a manner permitting an upward and rearward tilting movement thereof in a vertical plane and from approximately a horizontal to a vertical position, said setter frame including a central plate, side plates disposed upon opposite sides of said central plate and spaced apart therefrom, upstanding and outwardly bowed guard wings upon opposite sides of said setter frame, a transversely arranged plate connecting the forward ends of said central and side plates, a rock shaft journaled in bearings carried by the rear end of said setter frame, laterally projecting tines secured to said rock shaft, releasable means operative in a manner to retain said tines in a vertical position across the rear end of said setter frame when the latter is in a sheaf receiving position, means for delivering sheaves from a harvester to said setter frame, and means carried by said trailing frame and operative to automatically and intermittently tilt said setter frame and release said tine retaining means.

In testimony whereof I hereunto affix my signature in presence of two witnesses.

CLEMMA R. RANEY.

Witnesses:
W. G. HILEMAN,
JOHN QUIGLEY